(12) United States Patent
Miyabayashi et al.

(10) Patent No.: US 8,792,825 B2
(45) Date of Patent: Jul. 29, 2014

(54) TERMINAL APPARATUS AND COMMUNICATION METHOD, INFORMATION PROCESSING APPARATUS AND METHOD, NON-TRANSITORY STORING MEDIUM STORING PROGRAM, AND INFORMATION PROCESSING SYSTEM

(75) Inventors: Naoki Miyabayashi, Tokyo (JP); Tsutomu Nakatsuru, Tokyo (JP); Daisuke Itoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 213 days.

(21) Appl. No.: 13/424,697

(22) Filed: Mar. 20, 2012

(65) Prior Publication Data

US 2012/0252516 A1    Oct. 4, 2012

(30) Foreign Application Priority Data

Mar. 30, 2011    (JP) .................................. 2011-075960

(51) Int. Cl.
*H04B 5/00*    (2006.01)

(52) U.S. Cl.
USPC ......... 455/41.1; 455/41.2; 455/509; 455/515; 455/450; 370/338; 370/341

(58) Field of Classification Search
USPC .................. 455/41.1, 41.2, 509, 515, 450, 39
See application file for complete search history.

(56) References Cited

U.S. PATENT DOCUMENTS

| | | | | |
|---|---|---|---|---|
| 5,778,304 A * | 7/1998 | Grube et al. | ............... | 455/456.4 |
| 7,079,851 B2 | 7/2006 | Makuta | | |
| 7,412,224 B2 * | 8/2008 | Kotola et al. | .................. | 455/403 |
| 8,073,467 B2 * | 12/2011 | Gupta et al. | ............... | 455/456.3 |
| 8,346,867 B2 * | 1/2013 | Sharkey | ........................ | 709/204 |
| 8,374,122 B2 * | 2/2013 | Meier et al. | .................... | 370/328 |
| 8,396,485 B2 * | 3/2013 | Grainger et al. | ........... | 455/456.1 |
| 8,504,061 B2 * | 8/2013 | Grainger et al. | ........... | 455/456.1 |
| 2007/0043950 A1 | 2/2007 | Imanishi et al. | | |
| 2007/0140163 A1 | 6/2007 | Meier et al. | | |
| 2010/0075697 A1 | 3/2010 | Gupta et al. | | |
| 2011/0045835 A1 | 2/2011 | Chou et al. | | |
| 2011/0250875 A1 * | 10/2011 | Huang et al. | .................. | 455/418 |

FOREIGN PATENT DOCUMENTS

| | | |
|---|---|---|
| JP | 2004-046666 A | 2/2004 |
| JP | 2007-053454 A | 3/2007 |
| JP | 2007-214978 A | 8/2007 |
| WO | 2009058761 A1 | 5/2009 |

OTHER PUBLICATIONS

European Search Report EP 12156955, dated Jul. 10, 2012.

* cited by examiner

*Primary Examiner* — Marceau Milord
(74) *Attorney, Agent, or Firm* — Sony Corporation

(57) ABSTRACT

A terminal apparatus includes: a scan processing unit that scans for wireless communication apparatuses that are present in a range within which wireless communication is possible; a list generation unit that generates a list of the wireless communication apparatuses that are detected by the scan by the scan processing unit; a transmission unit that transmits the list that is generated by the list generation unit to an information processing apparatus; and a reception unit that receives connection destination related information that relates to a connection destination, which is transmitted from the information processing apparatus based on a comparison result of the list and the list from another terminal apparatus.

13 Claims, 18 Drawing Sheets

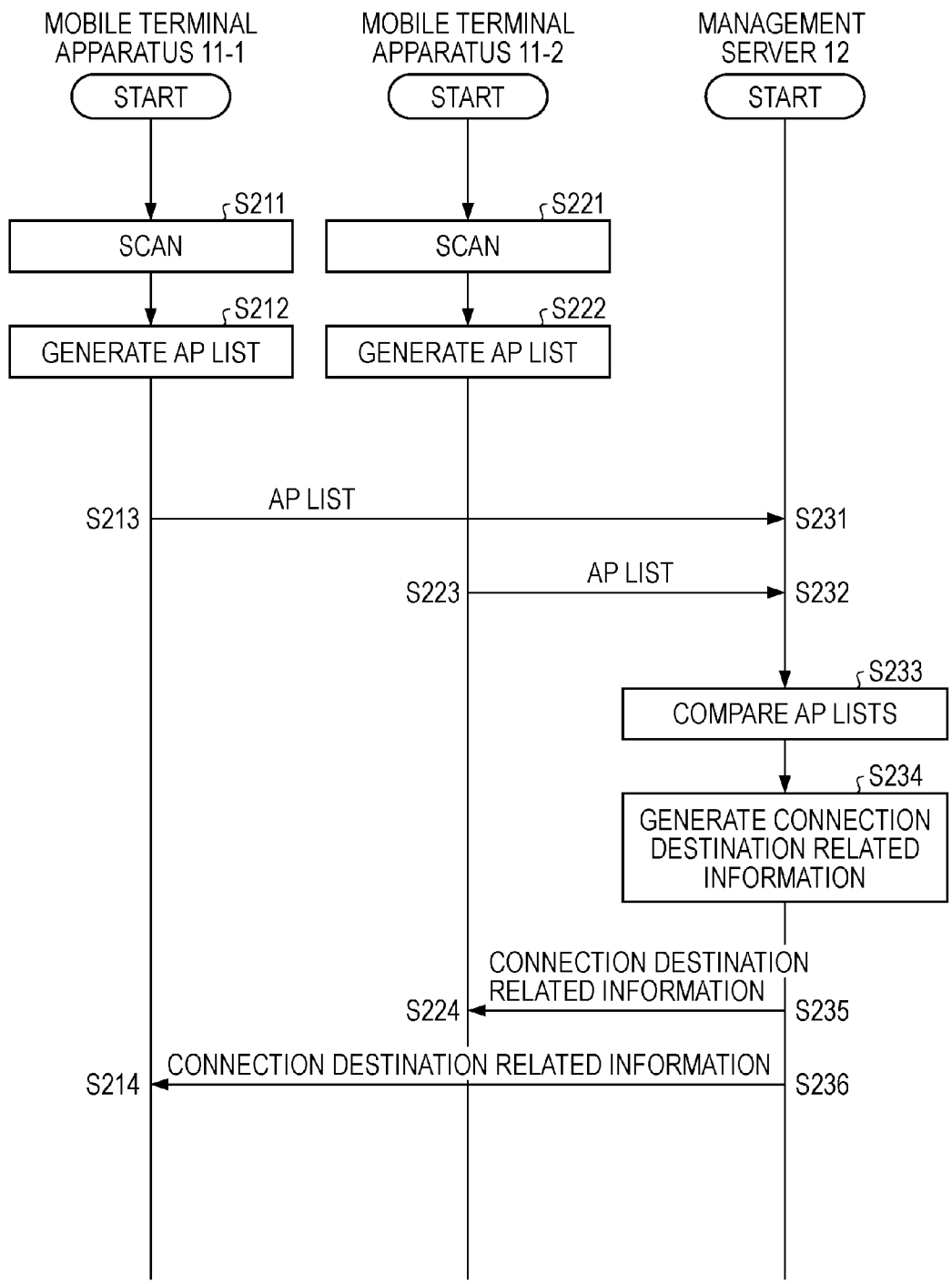

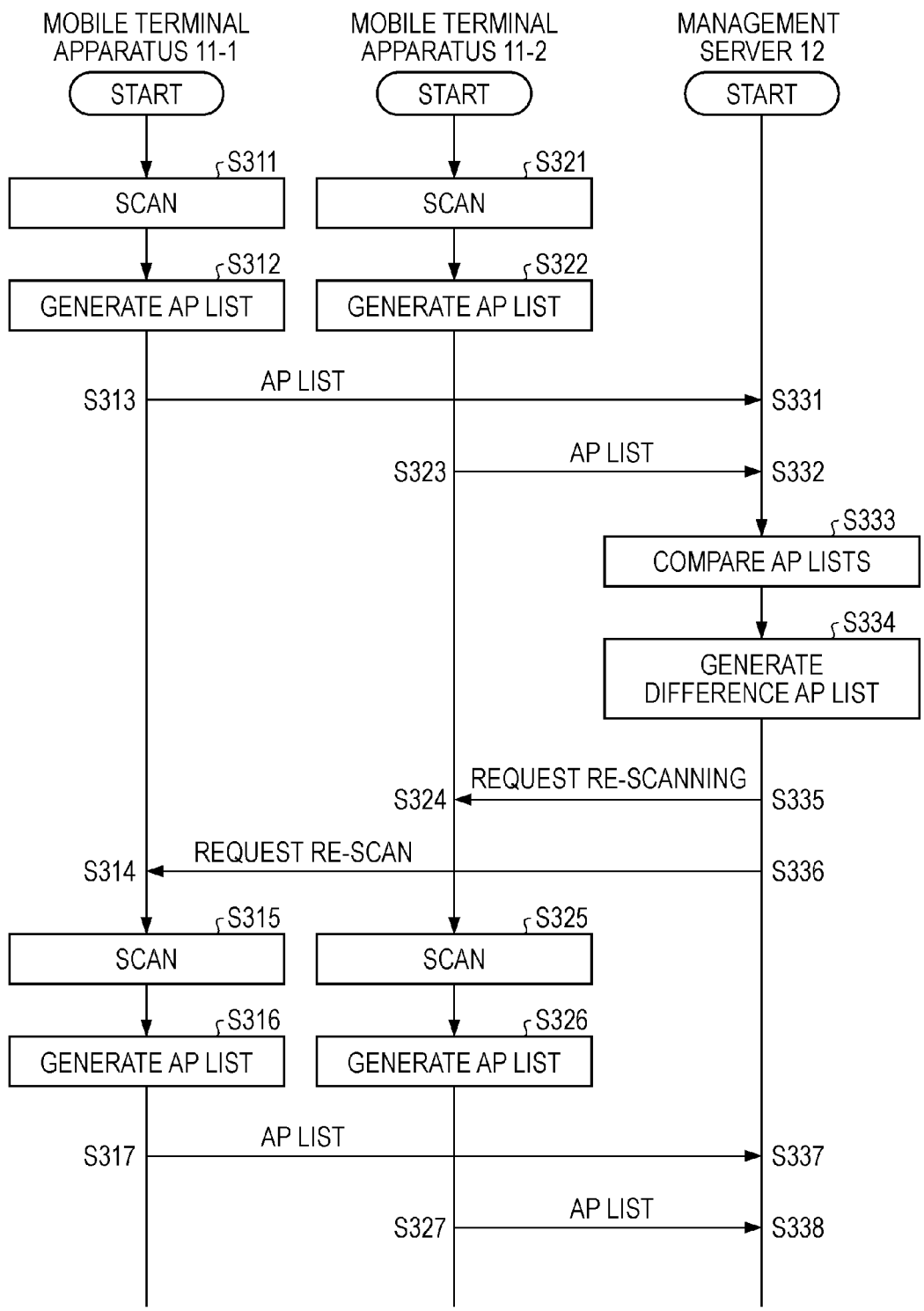

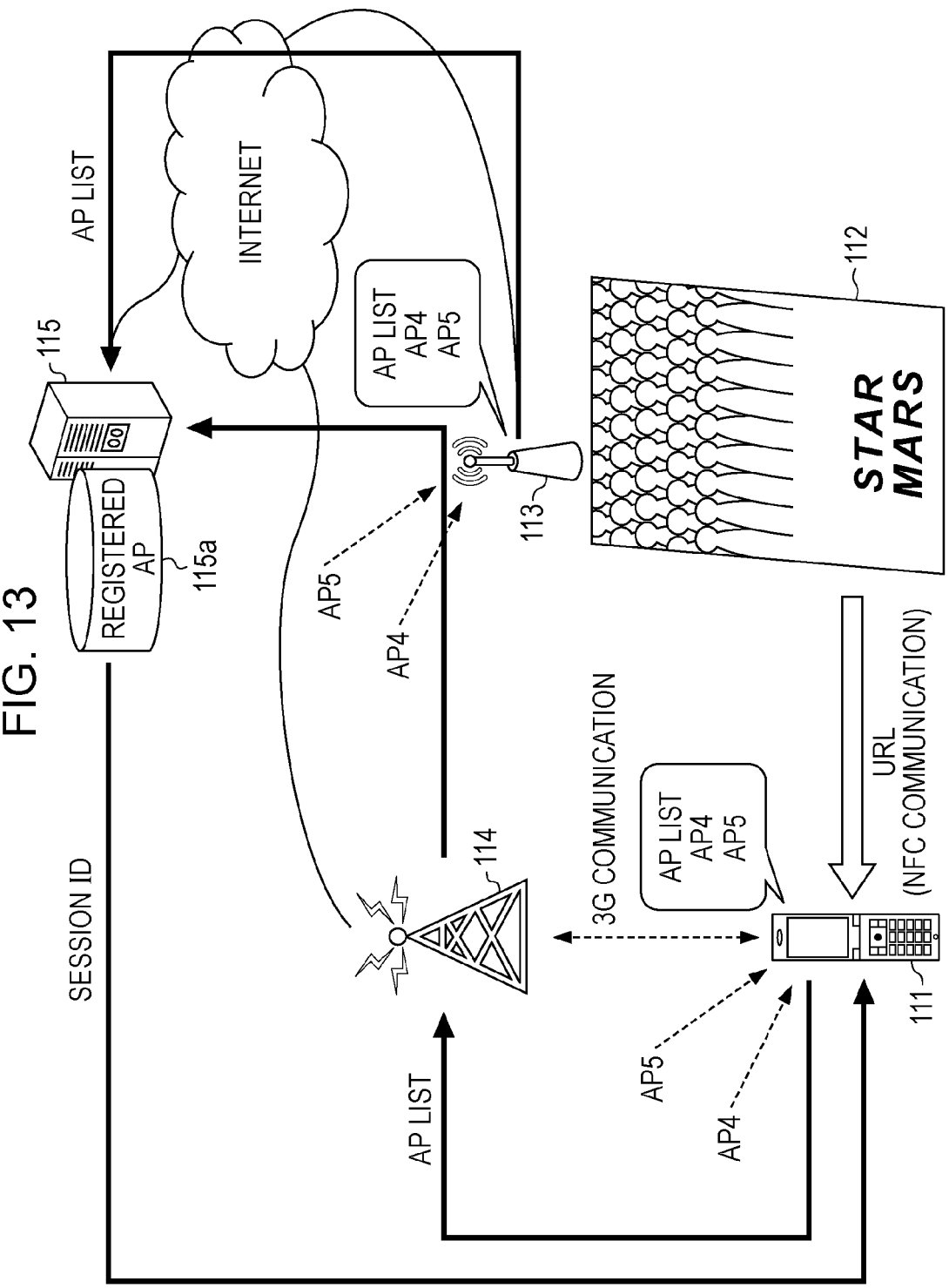

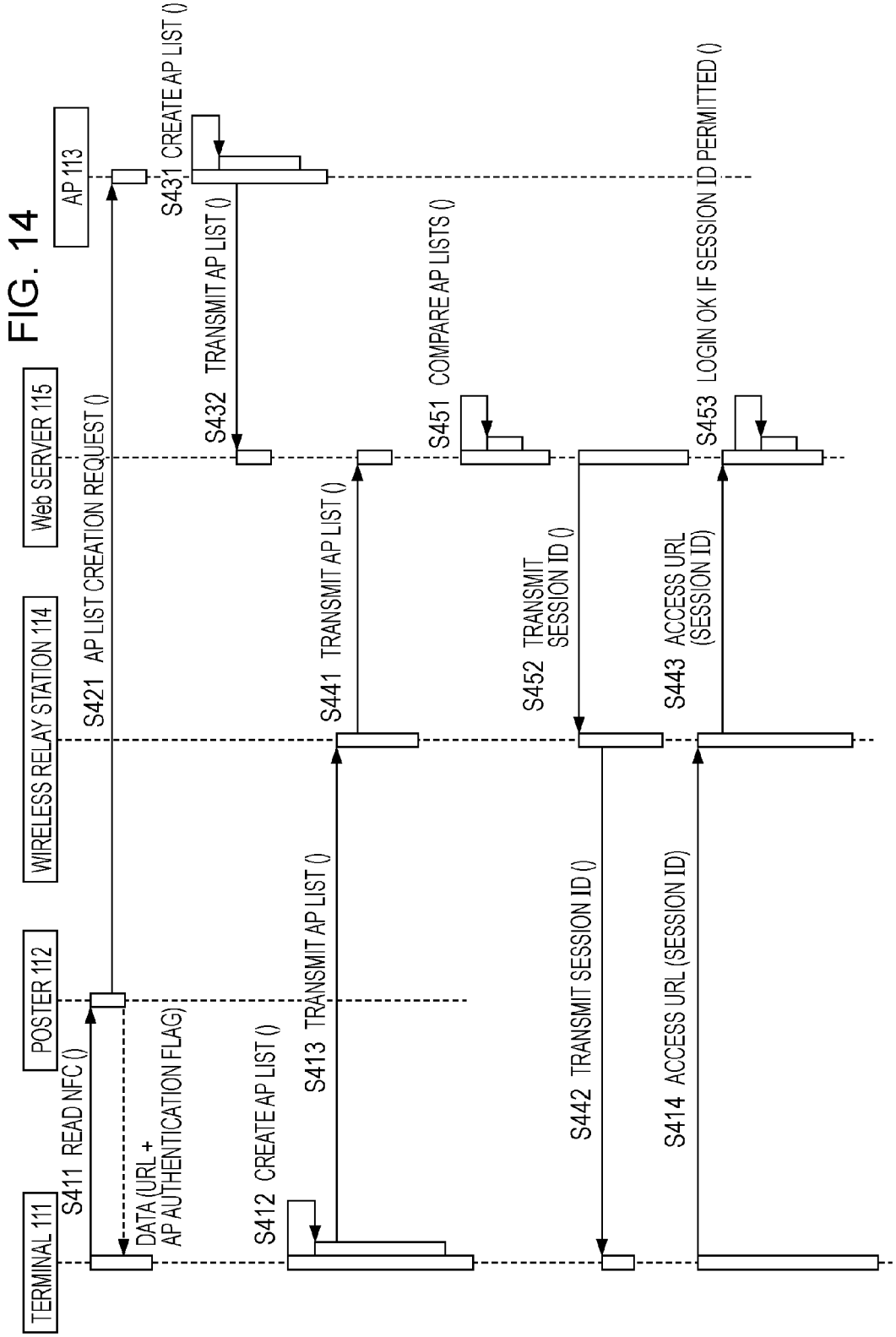

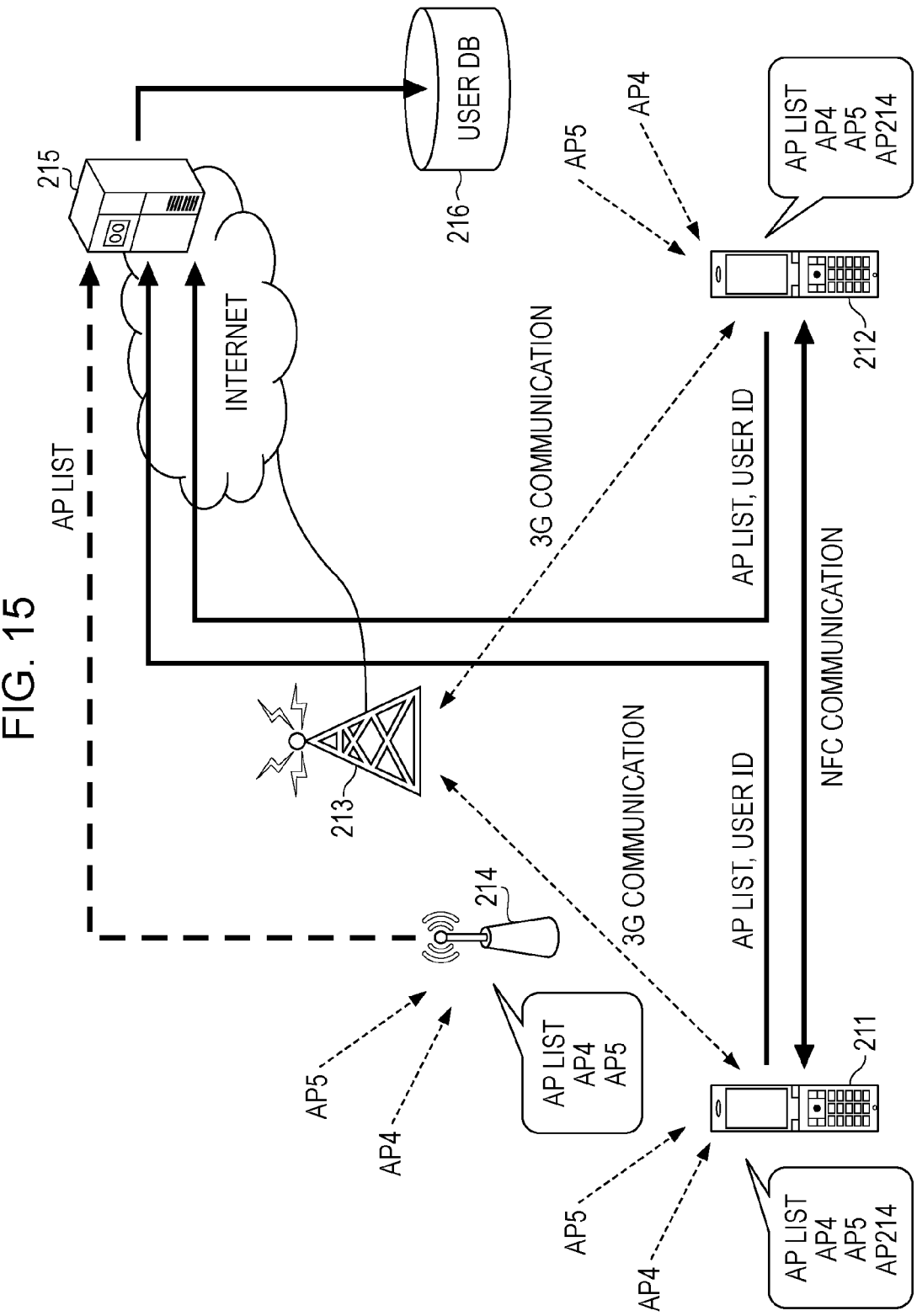

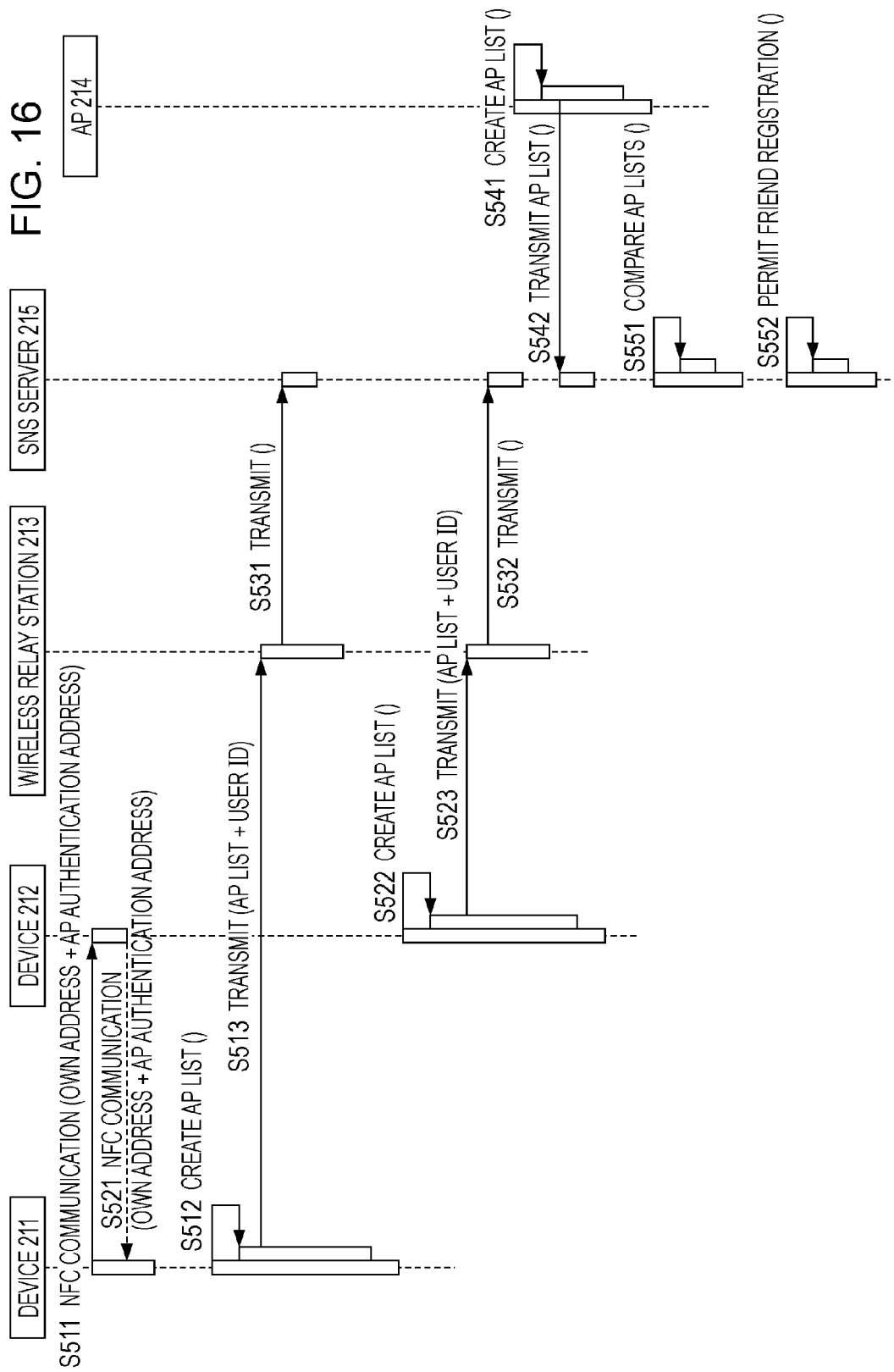

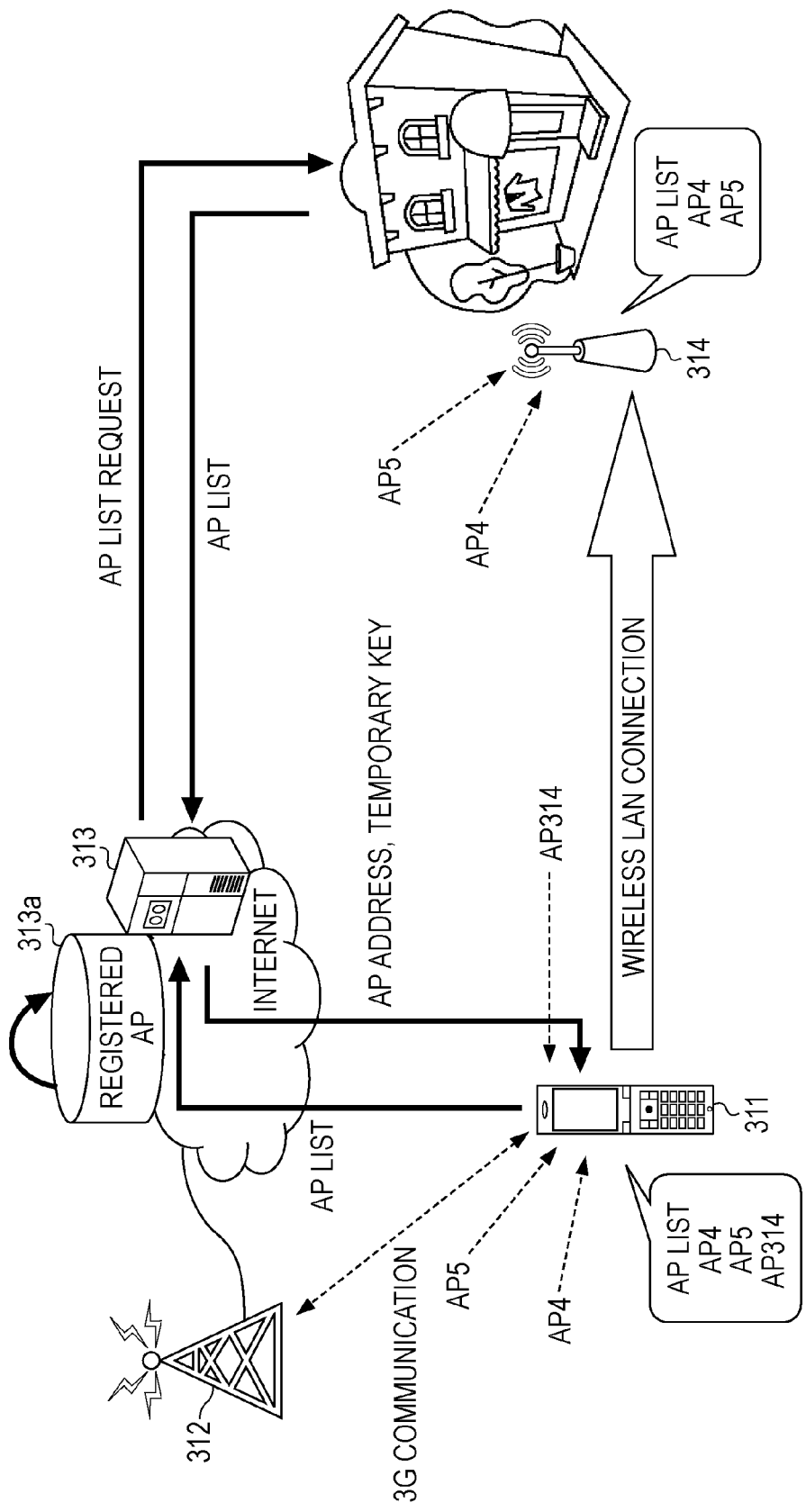

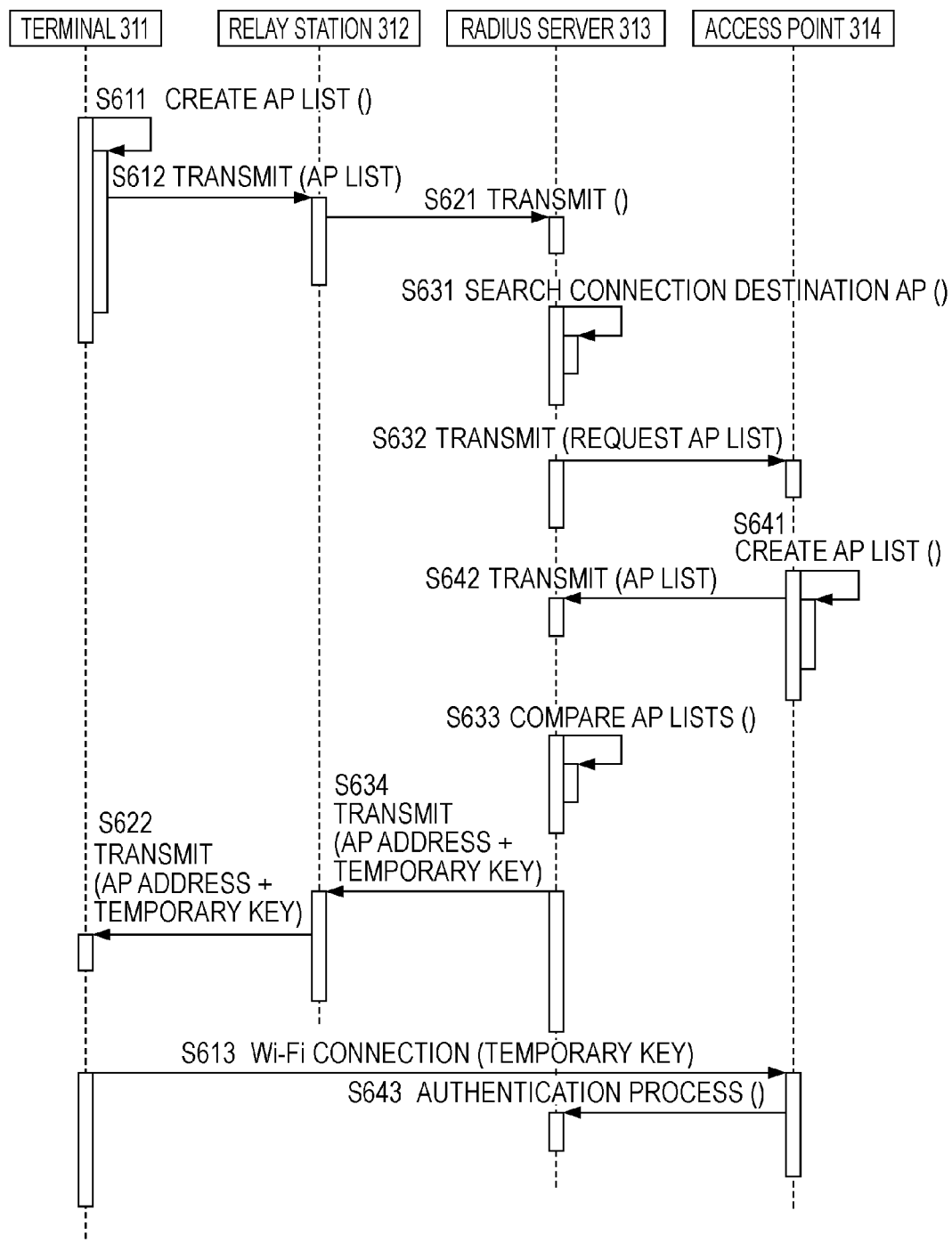

TERMINAL APPARATUS AND COMMUNICATION METHOD, INFORMATION PROCESSING APPARATUS AND METHOD, NON-TRANSITORY STORING MEDIUM STORING PROGRAM, AND INFORMATION PROCESSING SYSTEM

CROSS-REFERENCE TO RELATED APPLICATION

The present application claims priority from Japanese Patent Application No. JP 2011-075960, filed in the Japanese Patent Office on Mar. 30, 2011, the entire content of which is incorporated herein by reference.

BACKGROUND

The present disclosure relates to a terminal apparatus and a communication method, an information processing apparatus and method, a non-transitory storing medium storing a program, and an information processing system, and particularly relates to a terminal apparatus and a communication method, an information processing apparatus and method, a non-transitory storing medium storing a program, and an information processing system that are able to provide services that are limited to positions securely and at low-cost.

In recent years, along with the increase in sophisticated mobile terminals typified by smart phones, opportunities for providing services that are limited to positions within real space from cyberspace have been increasing.

For example, there is a system in which coupons are distributed only to those who have actually travelled to a shop by detecting the locations of the mobile terminals that such persons possess, a game in which only devices within wireless range are able to exchange items in a wireless LAN (Local Area Network) system, or the like. Further, a security service in which the entry time and the exit time at schools are recorded as attendance history using contactless IC (Integrated Circuit) cards and the mobile phones of the parents are notified in real time has already been begun.

As techniques of ascertaining the position within real space, generally, there is a technique of obtaining the latitude information and the longitude information according to GPS (Global Positioning System) and a technique of converting information of wireless LAN access points (hereinafter referred to as APs) into positional information.

For example, there is a system in which the usage authority of an application is managed according to the position of a client terminal by a client terminal that has received transmitted information from the AP including zone (positional) information transferring the positional information to a management server (for example, refer to Japanese Unexamined Patent Application Publication No. 2007-214978).

Further, there is a system in which the positional information is obtained from GPS and the AP and that manages access to the information resources that are associated with the positional information (for example, refer to Japanese Unexamined Patent Application Publication No. 2004-46666).

Furthermore, there is also an authentication device that permits connection if the position represented by the obtained positional information is within a range registered in advance (for example, refer to Japanese Unexamined Patent Application Publication No. 2007-53454).

SUMMARY

However, since a system that uses GPS uses artificial satellites and therefore becomes large in scale and uses dedicated terminals, the implementation cost becomes high. Further, with a system that uses wireless LAN APs, although the implementation cost is low since wireless LAN communication devices have been installed on many of the existing mobile terminals, the cost of constructing a database (DB) in which the APs and the positional information are associated is high.

Further, in a case when the positional information that is obtained from GPS or the APs is false, not only does the specification of the position become difficult, but in a case when applied to a security system, special processing such as encrypting the positional information is used. Further, with a tracking process or the like using a GPS function that is installed on mobile phones in recent years, since the positional information is used as the individual information, there is a concern over the invasion of privacy.

It is desirable to provide services that are limited to positions securely and at low cost.

According to a first embodiment of the present disclosure, there is provided a terminal apparatus including: a scan processing unit that scans for wireless communication apparatuses that are present in a range within which wireless communication is possible; a list generation unit that generates a list of the wireless communication apparatuses that are detected by the scan by the scan processing unit; a transmission unit that transmits the list that is generated by the list generation unit to an information processing apparatus; and a reception unit that receives connection destination related information that relates to a connection destination, which is transmitted from the information processing apparatus based on a comparison result of the list and the list from another terminal apparatus.

The reception unit may receive a request for a scan for the wireless communication apparatuses with predetermined conditions, which is transmitted from the information processing apparatus, and the scan processing unit may scan for the wireless communication apparatuses by the predetermined conditions based on the request that is received by the reception unit.

The reception unit may receive a request for a scan for the wireless communication apparatuses at a predetermined communication channel, which is transmitted from the information processing apparatus, and the scan processing unit may scan for the wireless communication apparatuses at the predetermined communication channel based on the request that is received by the reception unit.

The reception unit may receive a request for a scan for the wireless communication apparatuses in a predetermined communication mode which is transmitted from the information processing apparatus, and the scan processing unit scans for the wireless communication apparatuses in the predetermined communication mode based on the request that is received by the reception unit.

According to the first embodiment of the present disclosure, there is provided a communication method including: scanning for wireless communication apparatuses that are present in a range within which wireless communication is possible; generating a list of the wireless communication apparatuses that are detected by the scanning; transmitting the list that is generated by the list generating process to an information processing apparatus; and receiving connection destination related information that relates to a connection destination, which is transmitted from the information processing apparatus based on a comparison result of the list with the list from another terminal apparatus.

According to the first embodiment of the present disclosure, there is provided a non-transitory recording medium storing a program that causes a computer to execute: scanning for wireless communication apparatuses that are present in a range within which wireless communication is possible; generating a list of the wireless communication apparatuses that are detected by the scanning; transmitting the list that is generated by the list generating process to an information processing apparatus; and receiving connection destination related information that relates to a connection destination, which is transmitted from the information processing apparatus based on a comparison result of the list with the list from another terminal apparatus.

According to the first embodiment of the present disclosure, wireless communication apparatuses that are present in a range within which wireless communication is possible are scanned for, a list of the wireless communication apparatuses that are detected by the scan are generated, the generated list is transmitted to the information processing apparatus, and connection destination related information that relates to the connection destination, which is transmitted from the information processing apparatus based on a comparison result of the list and the list from another terminal apparatus.

According to a second embodiment of the present disclosure, there is provided an information processing apparatus including: a reception unit that receives lists of wireless communication apparatuses that are detected by a scan for the wireless communication apparatuses that are present in a range within which wireless communication is possible, which are respectively transmitted from two or more terminal apparatuses that perform wireless communication with the wireless communication apparatuses; a list comparison unit that compares the lists from the two or more terminal apparatuses which are received by the reception unit; a connection destination related information generation unit that generates connection destination related information that relates to the connection destinations of the terminal apparatuses based on a comparison result of the list comparison unit; and a transmission unit that transmits the connection destination related information that is generated by the connection destination information generation unit to the terminal apparatuses.

The list comparison unit may compare the number of wireless communication apparatuses that respectively match the lists from the two or more terminal apparatuses, and the connection destination related information generation unit may generate the connection destination related information in a case when the number of wireless communication apparatuses that respectively match the lists is greater than a predetermined number.

The transmission unit may transmit a request for a scan for the wireless communication apparatuses by predetermined conditions to the terminal apparatus in a case when the number of wireless communication apparatuses that respectively match the lists is less than the predetermined number.

The transmission unit may transmit a request for a scan at a communication channel of wireless communication with a higher radio field strength than a predetermined value to the terminal apparatus in wireless communication between the wireless communication apparatus and the terminal apparatus that do not match in a case when the number of wireless communication apparatuses that respectively match the lists is less than the predetermined number.

The transmission unit may transmit a request for a scan in a communication mode of wireless communication with a higher radio field strength than a predetermined value to the terminal apparatus in wireless communication between the wireless communication apparatus and the terminal apparatus that do not match in a case when the number of wireless communication apparatuses that respectively match the lists is less than the predetermined number.

The connection destination related information generation unit may perform authentication of the terminal apparatus based on a comparison result of the list comparison unit and may generate the connection destination related information.

According to the second embodiment of the present disclosure, there is provided an information processing method including: receiving lists of wireless communication apparatuses that are detected by a scan for the wireless communication apparatuses that are present in a range within which wireless communication is possible, which are respectively transmitted from two or more terminal apparatuses that perform wireless communication with the wireless communication apparatuses; comparing the lists from the two or more terminal apparatuses which are received by the receiving process; generating connection destination related information that relates to the connection destinations of the terminal apparatuses based on a comparison result by the comparing of the lists; and transmitting the connection destination related information that is generated by the process of generating the connection destination related information to the terminal apparatuses.

According to the second embodiment of the present disclosure, there is provided a non-transitory recording medium storing a program that causes a computer to execute: receiving list of wireless communication apparatuses that are detected by a scan for the wireless communication apparatuses that are present in a range within which wireless communication is possible, which are respectively transmitted from two or more terminal apparatuses that perform wireless communication with the wireless communication apparatuses; comparing the lists from the two or more terminal apparatuses which are received by the receiving process; generating connection destination related information that relates to the connection destinations of the terminal apparatuses based on a comparison result by the comparing of the lists; and transmitting the connection destination related information that is generated by the process of generating the connection destination related information to the terminal apparatuses.

According to the second embodiment of the present disclosure, lists of wireless communication apparatuses that are detected by a scan for the wireless communication apparatuses that are present in a range within which wireless communication is possible, which are respectively transmitted from two or more terminal apparatuses that perform wireless communication with the wireless communication apparatuses are received, the lists from the two or more terminal apparatuses which are received are compared, connection destination related information that relates to the connection destinations of the terminal apparatuses is generated based on the comparison result, and the generated connection destination related information is transmitted to the terminal apparatuses.

According to a third embodiment of the present disclosure, there is provided an information processing system including: two or more terminal apparatuses that perform wireless communication with wireless communication apparatuses; and an information processing apparatus that performs communication with the terminal apparatuses, wherein the terminal apparatuses include a scan processing unit that scans for the wireless communication apparatuses that are present in a range within which wireless communication is possible, a list generation unit that generates a list of the wireless communication apparatuses that are detected by a scan by the scan processing unit, a transmission unit that transmits the list that is generated by the list generation unit to an information processing apparatus, and a reception unit that receives connection destination related information that relates to a connection destination, which is transmitted from the information processing apparatus based on a comparison result between the list and the list from another terminal apparatus, wherein the information processing apparatus includes a reception unit that receives lists of wireless communication apparatuses that are detected by a scan for the wireless communication apparatuses that are present in a range within which wireless communication is possible, which are respectively transmitted from two or more terminal apparatuses that perform wireless communication with the wireless communication apparatuses, a list comparison unit that compares the lists from the two or more terminal apparatuses which are received by the reception unit, a connection destination related information generation unit that generates connection destination related information that relates to the connection destinations of the terminal apparatuses based on a comparison result of the list comparison unit, and a transmission unit that transmits the connection destination related information that is generated by the connection destination related information generation unit to the terminal apparatuses.

According to the third embodiment of the present disclosure, wireless communication apparatuses that are present in a range within which wireless communication is possible are scanned for, a list of the wireless communication apparatuses that are detected by the scan are generated, the generated list is transmitted to an information processing apparatus, connection destination related information that relates to a connection destination, which is transmitted from the information processing apparatus based on a comparison result between the list and the list from another terminal apparatus, lists of the wireless communication apparatuses that are detected by the scan for the wireless communication apparatuses that are present in a range within which wireless communication is possible, which are respectively transmitted from two or more terminal apparatuses that perform wireless communication with the wireless communication apparatuses are received by the information processing apparatus, the lists from the two or more terminal apparatuses which are received are compared, connection destination related information that relates to the connection destinations of the terminal apparatuses is generated based on the comparison result, and the generated connection destination related information is transmitted to the terminal apparatuses.

According to the first to third embodiments of the present disclosure, it is possible to provide services that are limited to positions securely and at low cost.

BRIEF DESCRIPTION OF THE DRAWINGS

FIG. 11 is an arrow chart that describes the flow of the connection authentication process;

FIG. 12 is another arrow chart that describes the flow of the connection authentication process;

FIG. 13 is a diagram that illustrates a configuration example of a website provision system to which the embodiments of the present disclosure are applied;

FIG. 14 is an arrow chart that describes the flow of processes according to the website provision system of FIG. 13;

FIG. 15 is a diagram that illustrates a configuration example of an SNS system to which the embodiments of the present disclosure are applied;

FIG. 16 is an arrow chart that describes the flow of processes according to the SNS system of FIG. 15;

FIG. 17 is a diagram that illustrates a configuration example of a content provision system to which the embodiments of the present disclosure are applied; and FIG. 18 is an arrow chart that describes the flow of processes according to the content provision system of FIG. 17.

DETAILED DESCRIPTION OF EMBODIMENTS

The embodiments of the present disclosure will be described below with reference to the drawings. Here, description will be given in the following order.
   1. Configuration of Information Processing System
   2. Hardware Configuration of Mobile Terminal Apparatus
   3. Hardware Configuration of Management Server
   4. Functional Configuration of Mobile Terminal Apparatus
   5. Functional Configuration of Management Server
   6. Connection Authentication Request Process of Mobile Terminal Apparatus
   7. Connection Authentication Process of Management Server
   8. Flow of Processes According to Information Processing System
   9. Applications of Present Disclosure <1. Configuration of Information Processing System>

Figure 1:
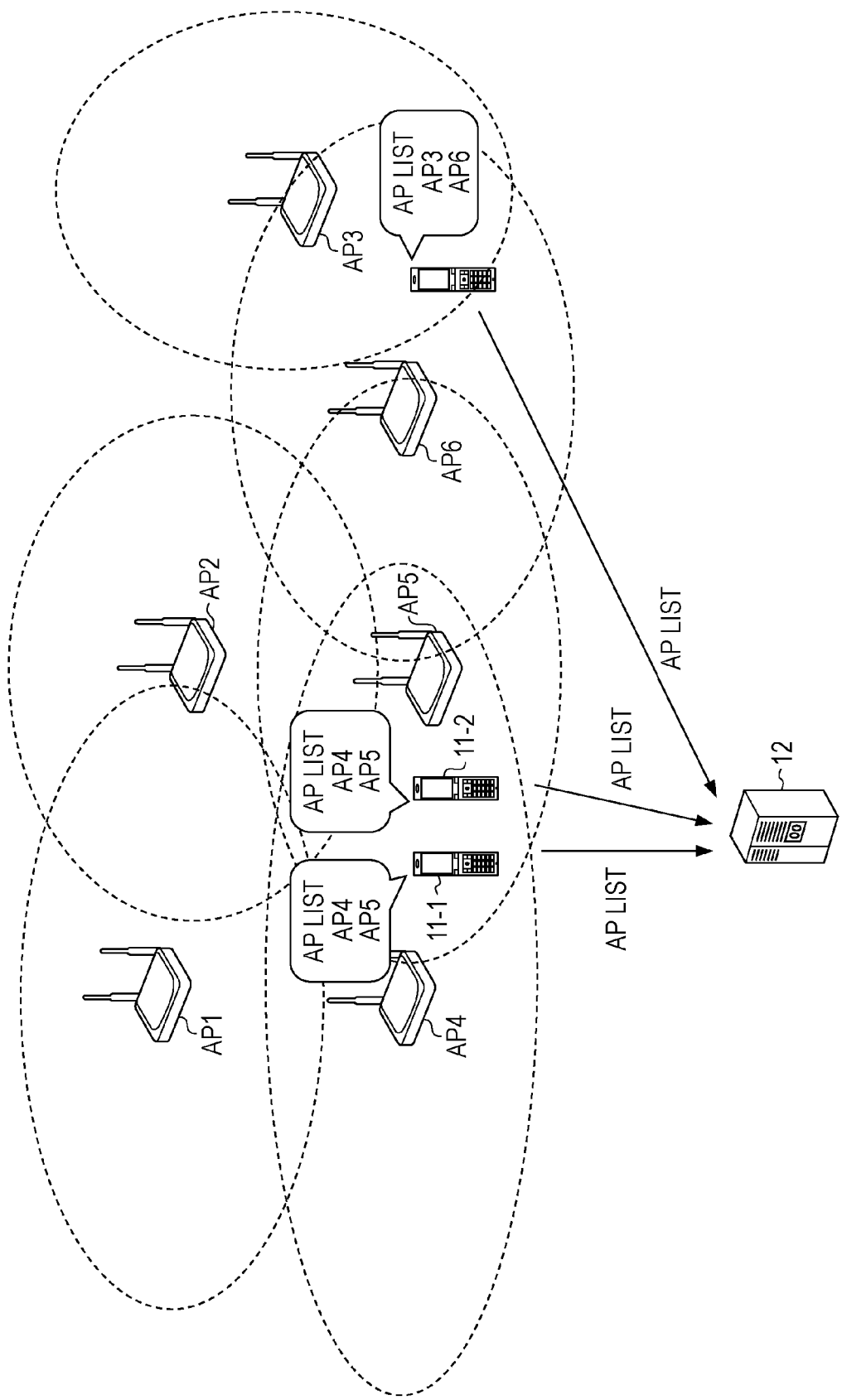
FIG. 1 is a diagram that illustrates a configuration example of an information processing system according to an embodiment of the present disclosure.

FIG. 1 illustrates a configuration example of an information processing system according to an embodiment of the present disclosure.

The information processing system of FIG. 1 is configured by wireless LAN access points (AP) 1 to 6, mobile terminal apparatuses 11-1 to 11-3, and a management server 12.

According to the information processing system of FIG. 1, the APs 1 to 6 respectively broadcast beacon packets that include the addresses thereof (MAC addresses) and communication parameters relating to the wireless LAN communication to terminals in the vicinity which are present within the radio range of access.

The mobile terminal apparatuses 11-1 to 11-3 recognize (detect) the presence of the APs 1 to 6 by performing wireless LAN communication and receiving the beacon packets from the APs 1 to 6. The mobile terminal apparatuses 11-1 to 11-3 generate AP lists that are the lists of the APs 1 to 6 and transmits the AP lists to the management server 12. In FIG. 1, since the mobile terminal apparatuses 11-1 and 11-2 are within the radio range of access of the APs 4 and 5, the AP lists of the APs 4 and 5 are generated and transmitted to the management server 12. Further, since the mobile terminal apparatus 11-3 is within the radio range of access of the APs 3 and 6, the AP lists of the APs 3 and 6 are generated and transmitted to the management server 12.

The management server 12 performs determination of whether or not the mobile terminal apparatuses 11-1 to 11-3 are present in the vicinity of one another (vicinity determination) by comparing the AP lists that are respectively transmitted from the mobile terminal apparatuses 11-1 to 11-3. For example, in a case when two mobile terminal apparatuses are present on exactly the same position and have exactly the same reception characteristics, the APs that the two mobile terminal apparatuses detect match. Therefore, the management server 12 performs vicinity determination based on the match of the APs of the AP lists from the mobile terminal apparatuses 11-1 to 11-3. That is, in FIG. 1, since the APs that are included in the AP list from the mobile terminal apparatuses 11-1 matches the APs that are included in the AP list from the mobile terminal apparatus 11-3, it is determined that the mobile terminal apparatuses 11-1 and 11-2 are present in the vicinity of each other. Further, since the APs that are included in the AP list from the mobile terminal apparatus 11-1 do not match the APs that are included in the AP list from the mobile terminal apparatus 11-2, it is determined that the mobile terminal apparatuses 11-1 to 11-3 are not present in the vicinity of each other.

Furthermore, as a result of the vicinity determination, the management server 12 transmits connection destination related information that relates to the respective connection destinations of the mobile terminal apparatuses 11-1 and 11-2 to the mobile terminal apparatuses 11-1 and 11-2 that are determined to be present in the vicinity of each other. The mobile terminal apparatuses 11-1 and 11-2 connect to predetermined connection destinations based on the connection destination related information from the management server 12.

Here, in a case when it is not important to respectively distinguish between the mobile terminal apparatuses 11-1 to 11-3 below, the mobile terminal apparatuses 11-1 to 11-3 will be referred to simply as mobile terminal apparatus 11. Further, the APs 1 to 6 may also function as the mobile terminal apparatus 11.

<2. Configuration of Mobile Terminal Apparatus>

Next, a configuration example of the mobile terminal apparatus 11 will be described with reference to FIG. 2.

Figure 2:
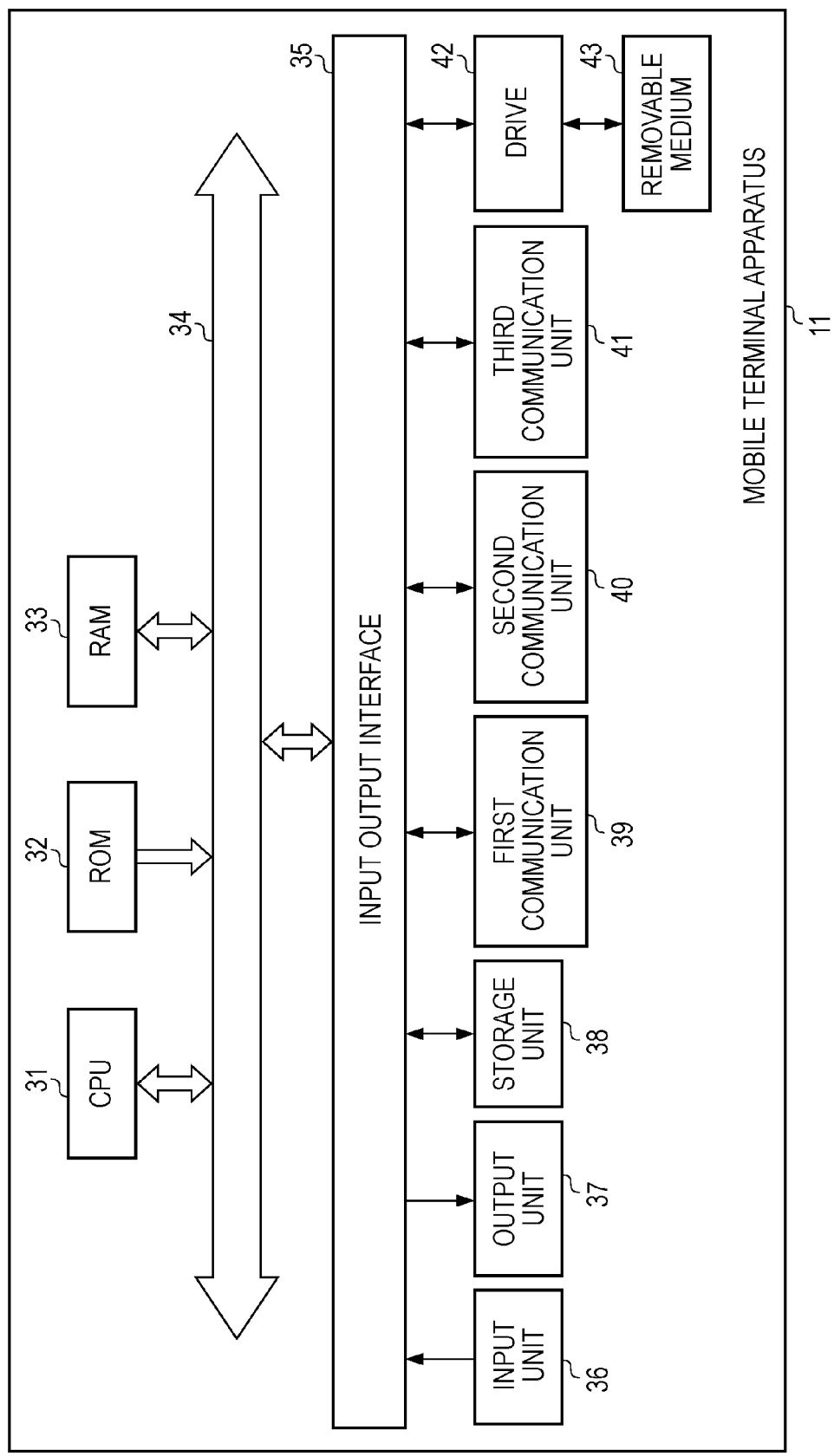
FIG. 2 is a block diagram that illustrates a configuration example of a mobile terminal apparatus.

In FIG. 2, a CPU (Central Processing Unit) 31 executes various processes according to a program that is stored in a ROM (Read Only Memory) 32 or a program that is loaded in a RAM (Random Access Memory) 33. The data that is used for the CPU 31 to execute various processes is also stored as appropriate in the RAM 33.

The CPU 31, the ROM 32, and the RAM 33 are connected to each other via a bus 34. An input output interface 35 is also connected to the bus 34.

An input unit 36 composed of keys, buttons, a touch panel, a microphone, and the like, an output unit 37 composed of a display composed of LCD (Liquid Crystal Display), organic EL (Electro-Luminescence), or the like, speakers, and the like, a storage unit 38 configured by a hard disk or the like, a first communication unit 39 composed of an antenna or the like that performs wireless communication, a second communication unit 40 composed of an antenna or the like that performs communication via a mobile communication network, and a third communication unit 41 composed of an antenna or the like that performs contactless proximity communication are connected to the input output interface 35.

The first communication unit 39 is a near field mobile communication device such as, for example, Bluetooth (registered trademark), IEEE (Institute of Electrical and Electronic Engineers) 802.11x, and the like. Here, near field mobile communication denotes local (narrow area) wireless communication in which the maximum communicable distance is approximately several meters to several tens of meters. The communication standard may be arbitrary.

The second communication unit 40 is a device that performs wireless communication with wireless base stations (not shown) and that performs communication via a mobile communication network. The second communication unit 40 is used not only for phone call applications using a 2 GHz frequency band, for example, but also various communication applications such as the Internet connection using data communication of a maximum of 2 Mbps. For example, wireless communication by the second communication unit 40 is used for downloading of content data, communication with the management server 12, and the like, and the second communication unit 40 is configured as a device or the like in which 3 G communication by a communication system of so-called third generation (3G) mobile phones is possible.

The third communication unit 41 is an NFC (Near Field Communication) device. Here, contactless communication is local (narrow band) wireless communication in which the maximum communicable distance is approximately several tens of centimeters. For example, the third communication unit 41 performs communication by a communication rate of a maximum of 424 Kbits per second of approximately 10 cm using a 13.56 MHz band frequency via an antenna.

In addition, a drive 42 is connected to the input output interface 35 as necessary and a removable medium 43 composed of a semiconductor memory or the like is fitted as appropriate, and a computer program that is read therefrom is installed on the storage unit 38 as necessary.

<3. Configuration of Management Server>

Next, a configuration example of the management server 12 will be described with reference to FIG. 3.

Figure 3:
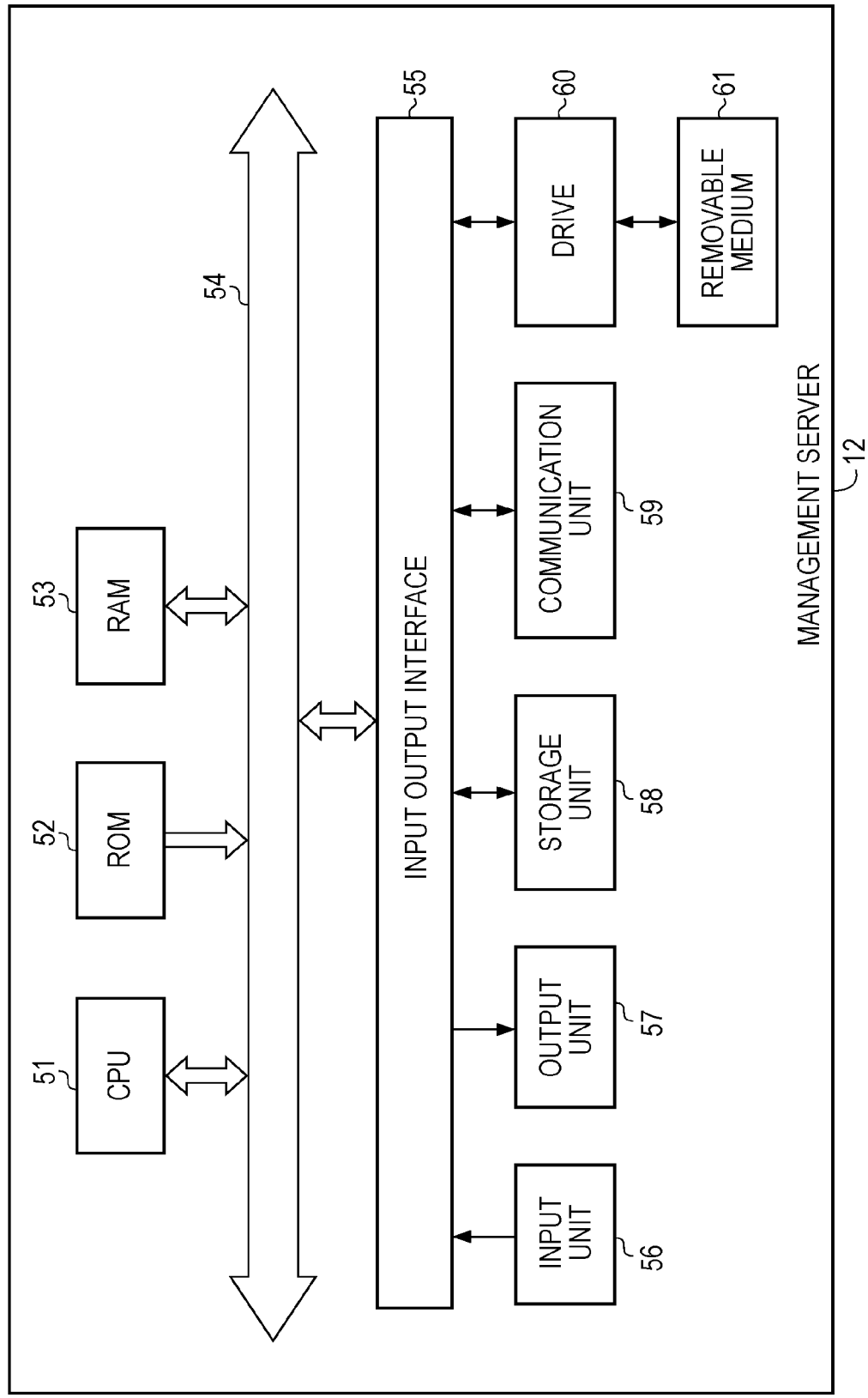
FIG. 3 is a block diagram that illustrates a configuration example of a management server.

In FIG. 3, a CPU 51 executes various processes according to a program that is stored in a ROM 52 or a program that is loaded in a RAM 53. Data that is used by the CPU 51 to execute various processes is also stored as appropriate in the RAM 53.

The CPU 51, the ROM 52, and the RAM 53 are connected to each other via a bus 54. An input output interface 55 is also connected to the bus 54.

An input unit 56 composed of a keyboard, a mouse, and the like, an output unit 57 composed of a display composed of a CRT (Cathode Ray Tube), LCD, or the like, speakers, and the like, a storage unit 58 configured by a hard disk or the like, and a communication unit 59 configured by a modem, a terminal adapter, and the like are connected to the input output interface 35.

The communication unit 59 performs a communication process via a network such as the Internet.

In addition, a driver 60 is connected to the input output interface 55 as necessary, a removable medium 61 composed of a magnetic disk, an optical disc, a magneto-optical disc, a semiconductor memory, or the like is fitted as appropriate, and a computer program that is read therefrom is installed on the storage unit 58 as necessary.

<4. Functional Configuration of Mobile Terminal Apparatus>

Next, a functional configuration of the mobile terminal apparatus 11 will be described with reference to FIG. 4.

Figure 4:
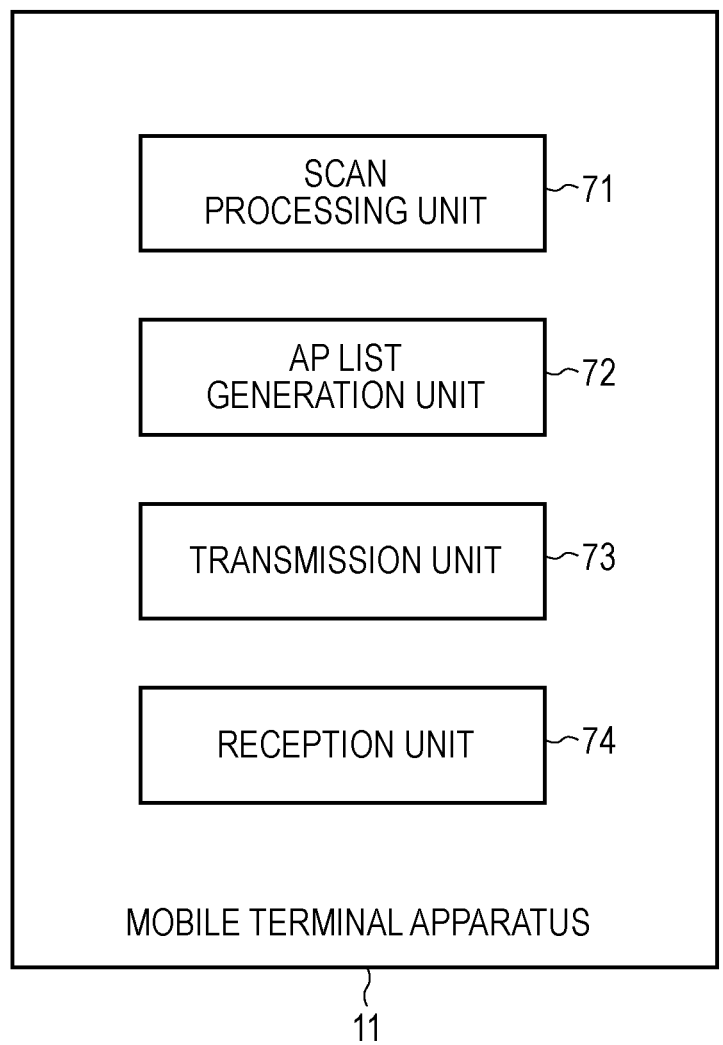
FIG. 4 is a block diagram that illustrates a functional configuration example of a mobile terminal apparatus.

The mobile terminal apparatus 11 of FIG. 4 is configured by a scan processing unit 71, an AP list generation unit 72, a transmission unit 73, and a reception unit 74.

The scan processing unit 71 scans for the APs. Specifically, the scan processing unit 71 detects the presence of APs by performing near field wireless communication and receiving the beacon packets from the APs.

The AP list generation unit 72 generates the AP lists of the AP information that is information relating to the APs that are detected by the scan processing unit 71.

The transmission unit 73 transmits the AP lists that are generated by the AP list generation unit 72 to the management server 12 via a mobile communication network.

The reception unit 74 receives information according to the comparison result with other AP lists from other mobile terminal apparatuses 11 in the management server 12 which are transmitted from the management server 12 via the mobile communication network.

<5. Functional Configuration of Management Server>

Next, a functional configuration of the management server 12 will be described with reference to FIG. 5.

Figure 5:
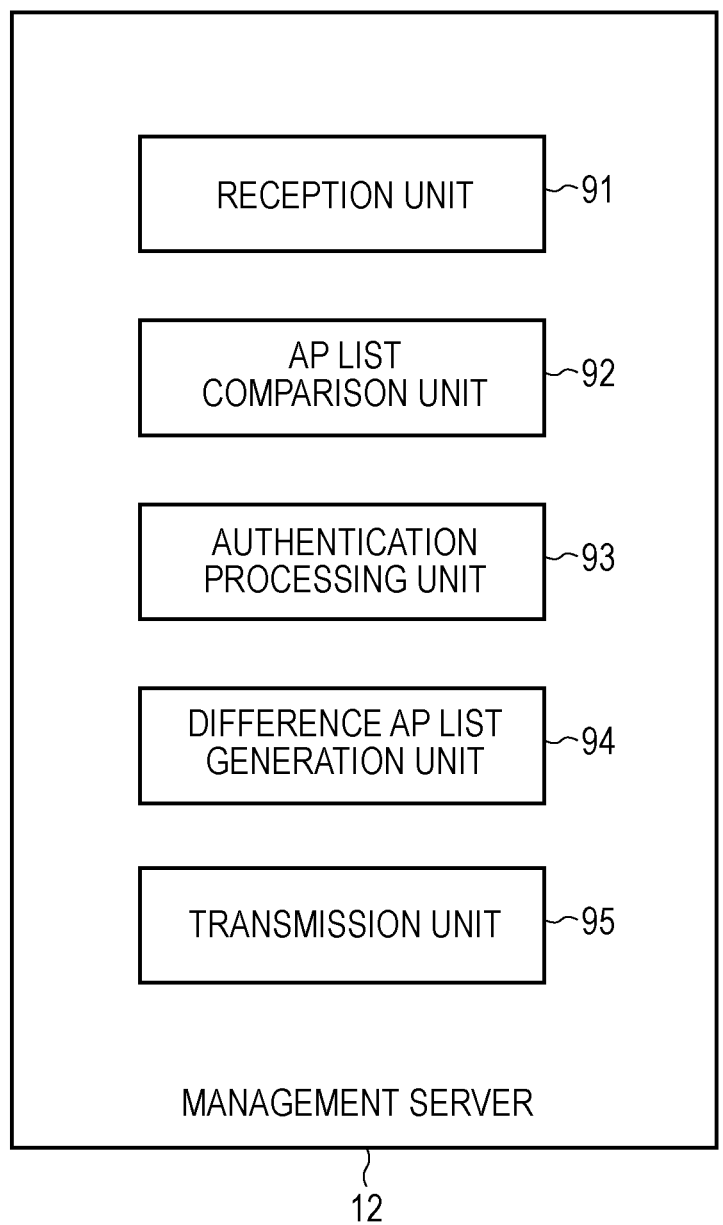
FIG. 5 is a block diagram that illustrates a functional configuration example of a management server.

The management server 12 of FIG. 5 is configured by a reception unit 91, an AP list comparison unit 92, an authentication processing unit 93, a difference AP list generation unit 94, and a transmission unit 95.

The reception unit 91 receives the AP lists that are transmitted from a plurality of (two or more) mobile terminal apparatuses 11 via a mobile communication network.

The AP list comparison unit 92 compares the AP lists from the two or more mobile terminal apparatuses 11 which are received by the reception unit 91. Specifically, the AP list comparison unit 92 compares the number of APs (AP information) that match in the AP lists from the two or more mobile terminal apparatuses 11.

In a case when the number of APs that match is greater than a predetermined number as a result of the comparison of the AP lists by the AP list comparison unit 92, the authentication processing unit 93 authenticates the mobile terminal apparatuses 11 that are the transmission sources of the AP lists, and generates connection destination related information that relates to the connection destinations of the mobile terminal apparatuses 11.

In a case when the number of APs that match is less than the predetermined number as a result of the comparison of the AP lists by the AP list comparison unit 92, the difference AP list generation unit 94 generates a difference AP list that is a list of the APs that do not match in the respective AP lists.

In a case when the number of APs that match is greater than the predetermined number as a result of the comparison of the AP lists by the AP list comparison unit 92, the transmission unit 95 transmits the connection destination related information that is generated by the authentication processing unit 93 to the mobile terminal apparatuses 11 that are the transmission sources of the compared AP lists. Further, in a case when the number of APs that match is less than the predetermined number as a result of the comparison of the AP list by the AP list comparison unit 92, the transmission unit 95 transmits a request for a re-scan for the APs by predetermined conditions based on the difference AP list generated by the difference AP list generation unit 94 to the mobile terminal apparatuses 11.

<6. Connection Authentication Request Process of Mobile Terminal Apparatus>

Figure 6:
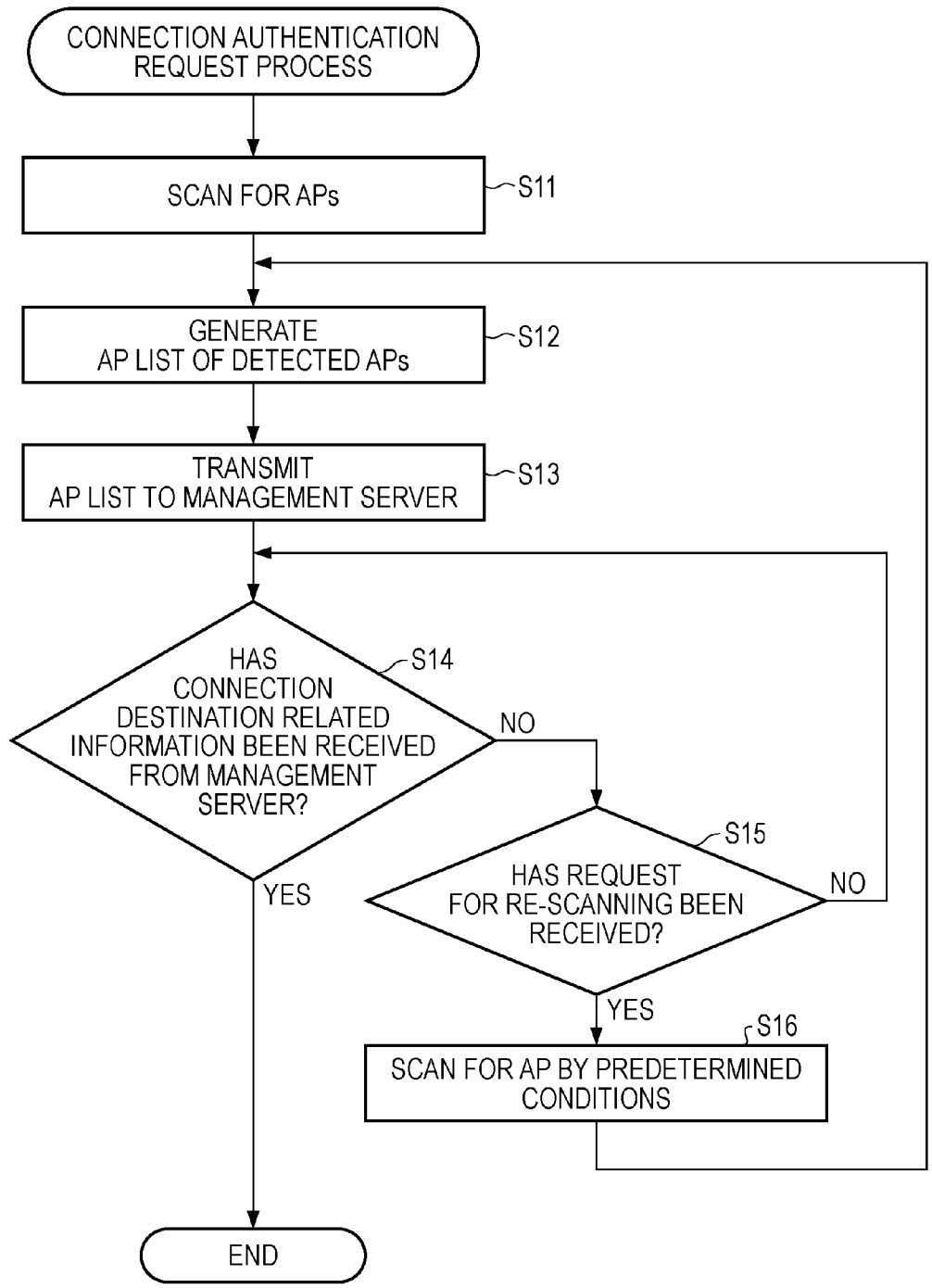
FIG. 6 is a flowchart that describes a connection authentication request process.

Next, a connection authentication request process of the mobile terminal apparatus 11 will be described with reference to the flowchart of FIG. 6. The connection authentication request process of FIG. 6 is started when connection to a connection destination to which services that are limited to the position of the mobile terminal apparatus 11 is instructed by an operation input by a user to the input unit 36 (FIG. 2).

The scan processing unit 71 scans for the APs in step S11. That is, the scan processing unit 71 detects the APs by performing near field wireless communication and receiving the beacon packets from the APs.

In step S12, the AP list generation unit 72 generates an AP list that is a list of the AP information of the APs that are detected by the scan processing unit 71.

[Detection Method of Wireless LAN Communication Device]

Here, a detection method of a wireless LAN communication device that includes APs will be described. Among detection methods of a wireless LAN communication device, there is a passive scanning method and an active scanning method.

Figure 7:
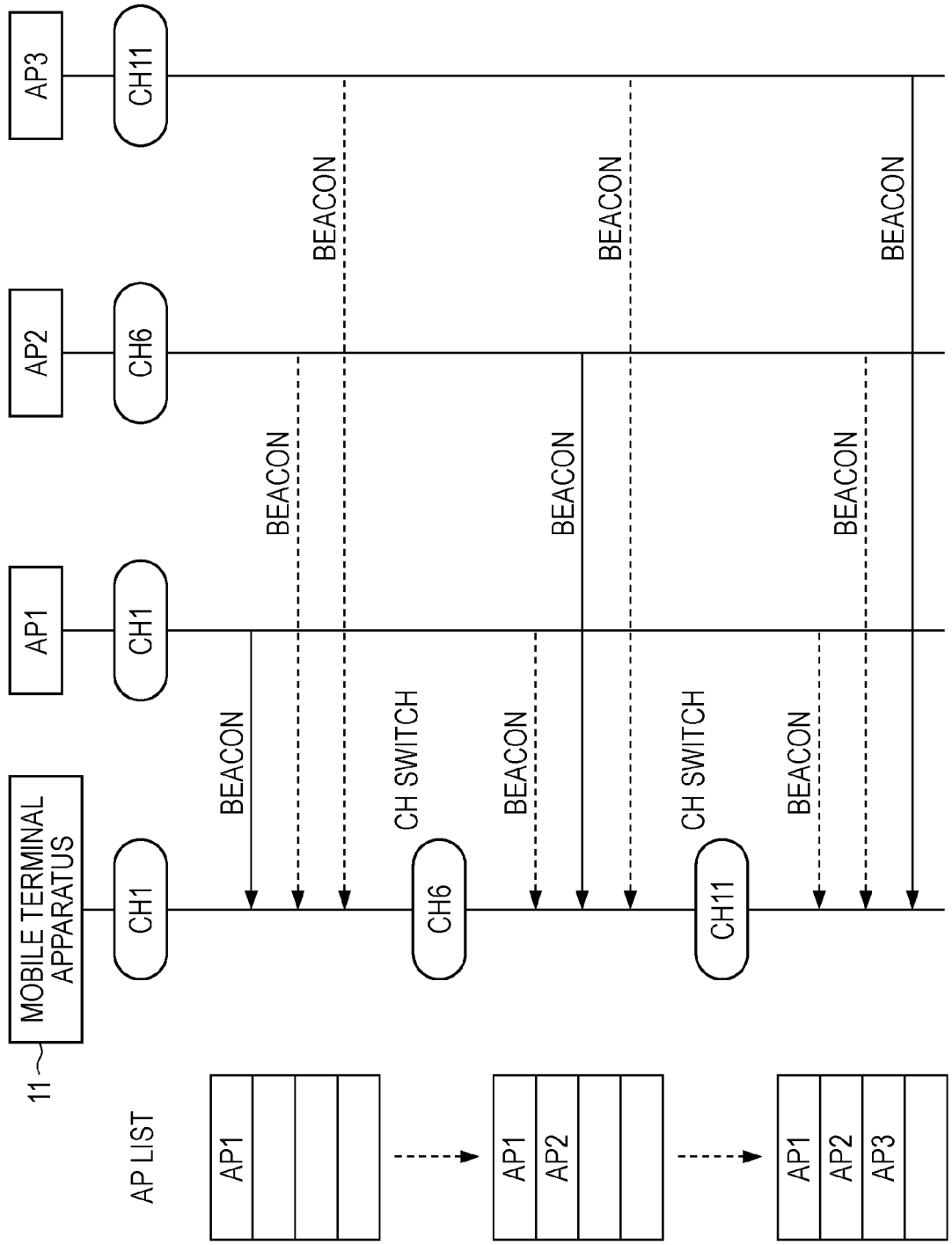
FIG. 7 is a diagram that describes a detection method of a wireless LAN communication device.

FIG. 7 is a diagram that describes a detection method of a wireless LAN communication device by passive scanning. The passive scanning method is used when generating an AP list of the APs in an infrastructure mode or an AP list of a group owner in a Wi-Fi Direct mode.

As illustrated in FIG. 7, the mobile terminal apparatus 11 stands by for a fixed amount of time at the respective communication channels of CH1, CH6, and CH11, and receive the beacon packets that are transmitted from the APs 1 to 3. In FIG. 7, the communication channels of the APs 1 to 3 are respectively fixed to CH1, CH6, and CH11, and the beacon packets indicated by the solid arrows are received by the mobile terminal apparatus 11. The mobile terminal apparatus 11 extracts the MAC addresses and the network names from the received beacon packets and stores the MAC addresses and the network names along with the strength of the radio signals when the beacon packets are received (RSSI (Received Signal Strength Indicator) and the channel numbers that represent the communication channels in an AP list.

Figure 8:
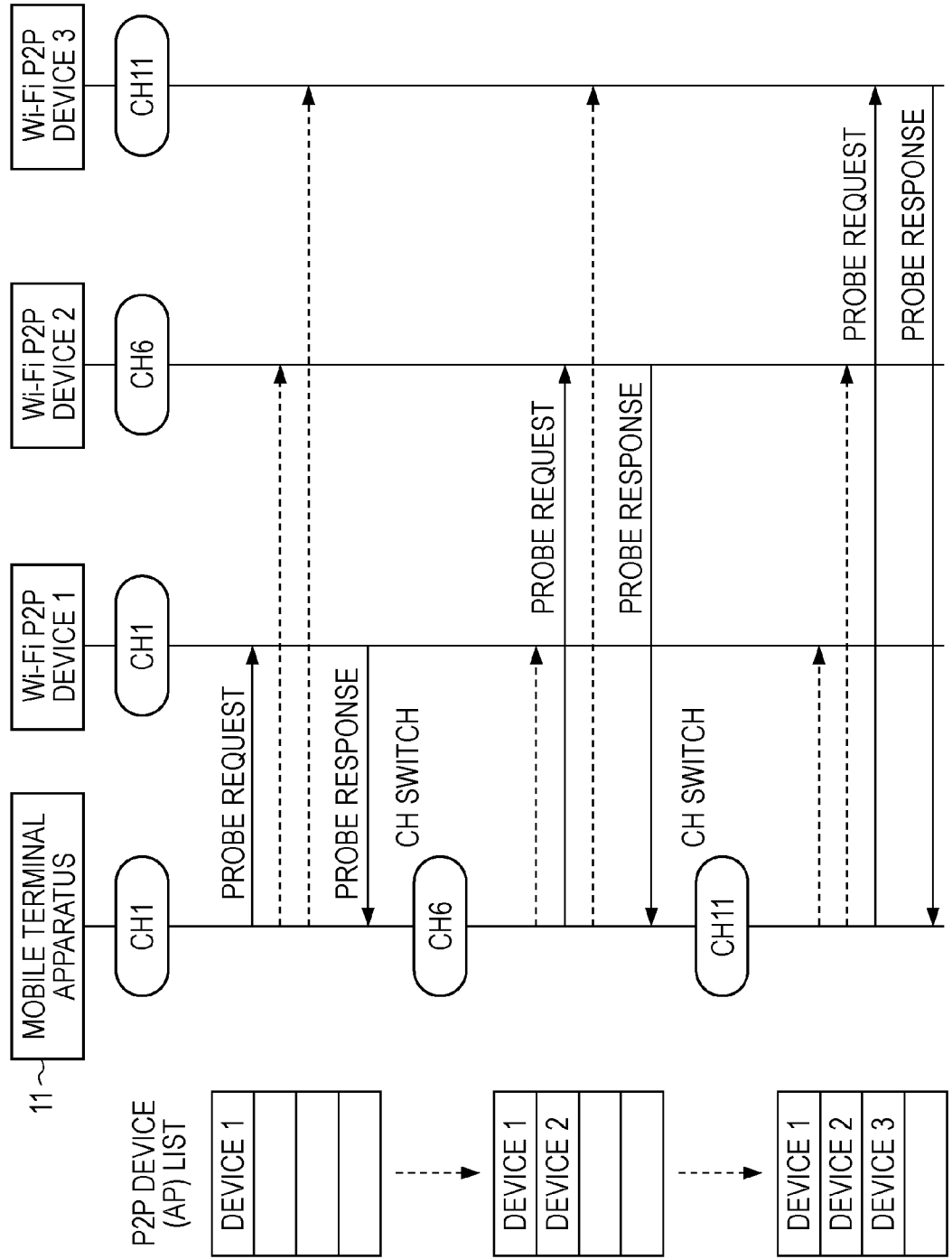
FIG. 8 is another diagram that describes a detection method of a wireless LAN communication device.

FIG. 8 is a diagram that describes a detection method of a wireless LAN communication device by active scanning. The active scanning method is used when detection Wi-Fi Direct compatible devices, and the like.

Generally with a Wi-Fi Direct compatible device, the channel is not fixed until the master-servant relationship (client or owner) is determined, and such devices do not transmit beacon packets themselves. Therefore, as illustrated in FIG. 8, the mobile terminal apparatus 11 broadcasts Probe Request packets by the respective communication channels of CH1, CH6, and CH11 in order to detect Wi-Fi P2P devices 1 to 3 as Wi-Fi Direct compatible devices. In FIG. 8, the channel numbers of the Wi-Fi P2P devices 1 to 3 at such a timing are respectively CH1, CH6, and CH11, and the Probe Request packets that are indicated by the solid arrows are received by the Wi-Fi P2P devices 1 to 3. In a case when in a Listen mode, the Wi-Fi P2P devices 1 to 3 respectively transmit the Probe Response packets to the mobile terminal apparatus 11. In so doing, the mobile terminal apparatus 11 generates a P2P device list as an AP list.

Here, according to the active scanning method, since a response is obtained from the detection target only in a case when the device (AP) that is the detection target and the communication match and the detection target is in the Listen mode, the time taken in the detection of the wireless LAN communication device generally becomes longer than with the passive scanning method. Therefore, as a detection method of a wireless LAN communication device, it is preferable that the active scanning method be treated as an option and applied in a case when a more detailed list is demanded.

In such a manner, the APs are detected and an AP list is created.

In step S13, the transmission unit 73 transmits the AP list that is generated by the AP list generation unit 72 to the management server 12 via a mobile communication network.

In step S14, it is determined whether or not the reception unit 74 has received the connection destination related information that is generated based on the result of a comparison of the AP list that is transmitted from the management server 12 in step S13 and an AP list that is transmitted from another mobile terminal apparatus 11 to the management server 12 has been received.

In a case when it is determined in step S14 that the connection destination related information from the management server 12 has been received, the mobile terminal apparatus 11 becomes able to connect to the connection destination to which services that are limited to such a position are provided, and the process ends.

On the other hand, in a case when it is determined in step S14 that the connection destination related information from the management server 12 has not been received, the process proceeds to step S15 and it is determined whether or not the reception unit 74 has received a request for a re-scan for the APs which is generated based on the result of a comparison between the AP list that is transmitted from the management server 12 in step S13 and an AP list that is transmitted from another mobile terminal apparatus 11 to the management server 12.

In a case when it is determined in step S15 that the request for a re-scan has been received from the management server 12, the process proceeds to step S16 and the scan processing unit 71 detects the APs be predetermined conditions that are included in the request for the re-scan from the management server 12. Here, the predetermined conditions are, for example, a specific communication channel or a specific communication mode. After step S16, the process returns to step S12 and the processes thereafter are repeated.

On the other hand, in a case when it is determined in step S15 that the request for a re-scan from the management server 12 has not been received, the process returns to step S14 and the processes thereafter are repeated.

According to the above processes, connection destination related information based on the result of a comparison between the AP list of the APs that are detected by the position of the mobile terminal apparatus 11 which is generated and transmitted to the management server 12 and the AP list of another mobile terminal apparatus 11 which is transmitted from the management 12 is received. Therefore, since a large-scale system such as GPS is not used, a database in which the APs and the positional information are associated is not constructed, and the positional information of the mobile terminal apparatus 11 is not directly used, it is possible for services that are limited to positions to be used by users securely and at low cost.

<7. Connection Authentication Process of Management Server>

Next, the connection authentication process of the management server 12 will be described with reference to the flowchart of FIG. 7.

It is determined in step S111 whether or not the reception unit 91 receives two AP lists that are transmitted from two mobile terminal apparatuses 11 via a mobile communication network.

The process of step S111 is repeated until the two AP lists are received, and when it is determined that the two AP lists have been received, the process proceeds to step S112 and the AP list comparison unit 92 determines whether or not an opposing AP is present in the AP list.

Here, an opposing AP is the mobile terminal apparatus 11 in a case when one of the two mobile terminal apparatuses 11 that are the transmission sources of the two received AP lists also functions as an AP, and it is determined in step S112 whether or not the AP information of the mobile terminal apparatus 11 that functions as an AP is present in the AP list of the other mobile terminal apparatus (hereinafter also referred to as the opposing terminal). Here, the process of step S112 may be skipped in a case when neither of the two mobile terminal apparatuses 11 that are the transmission sources of the two received AP lists function as APs.

In a case when it is determined in step S112 that an opposing AP is present in the AP list, the process proceeds to step S113 and the AP list comparison unit 92 determines whether or not the number of APs that match in the two AP lists is greater than a predetermined number.

Here, an example of the comparison of AP lists by the AP list comparison unit 92 will be described with reference to FIG. 10.

Figure 10:
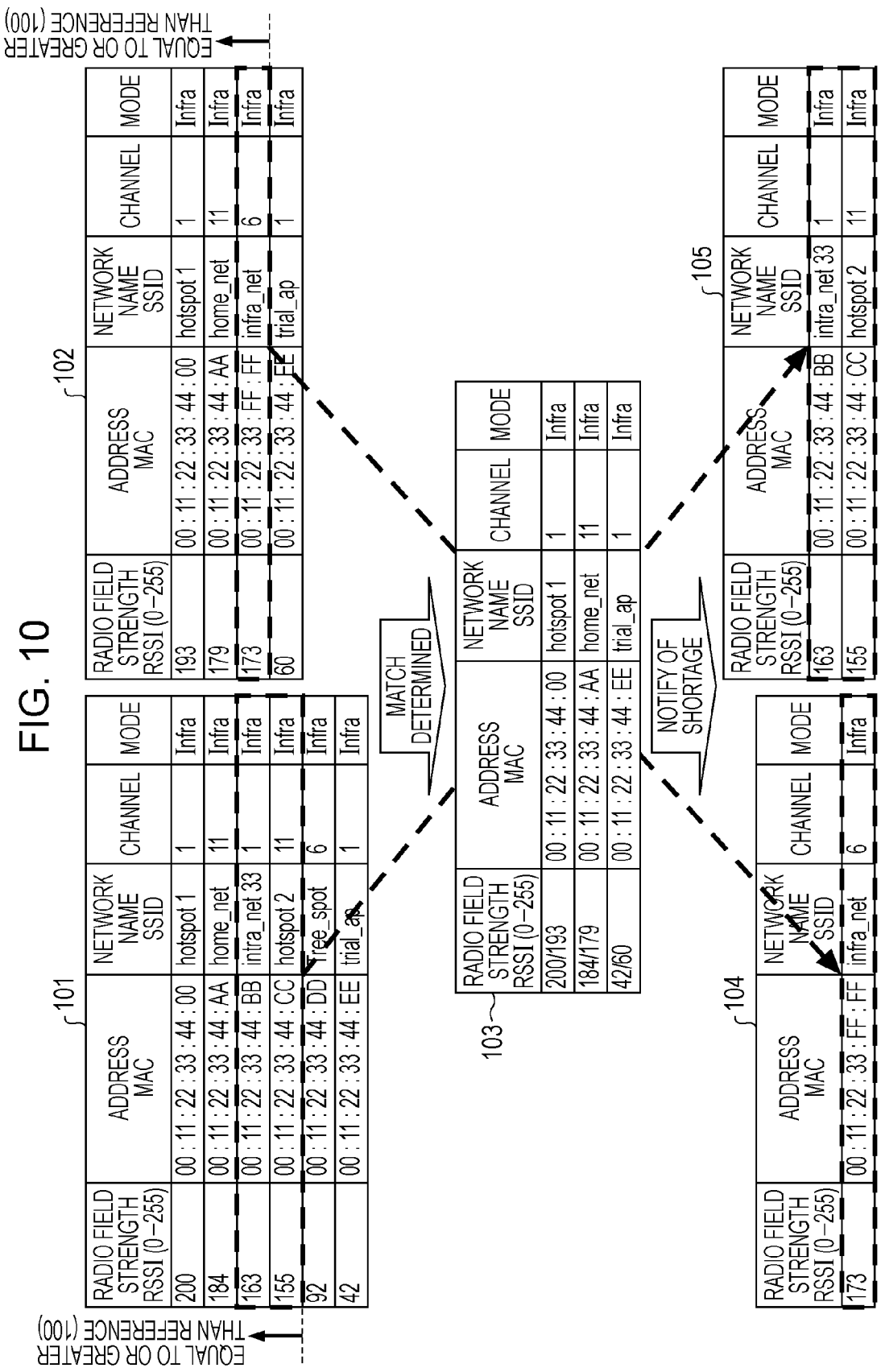
FIG. 10 is a flowchart that describes an example of a comparison of AP lists.

AP lists 101 and 102 illustrated in FIG. 10 are respectively two lists that are transmitted, for example, from the mobile terminal apparatuses 11-1 and 11-2. The AP lists illustrated in FIG. 10 are configured by the radio signal strengths (RSSI), the addresses (MAC addresses), the network names (SSID (Service Set ID)), the channels (communication channels), and the modes (communication modes) as the respective AP information of the APs. In FIG. 10, the AP list 101 is configured by the AP information of six APs, and the AP list 102 is configured by the AP information of four APs.

When the AP lists 101 and 102 are compared, the three APs with the network names "hotspot1", "home_net", and "trial_ap" are APs that match in the two AP lists, and a matching AP list 103 is obtained. Furthermore, it is determined in step 113 whether or not three that is the number of APs that match in the AP lists 101 and 102 is greater than a predetermined number.

Figure 9:
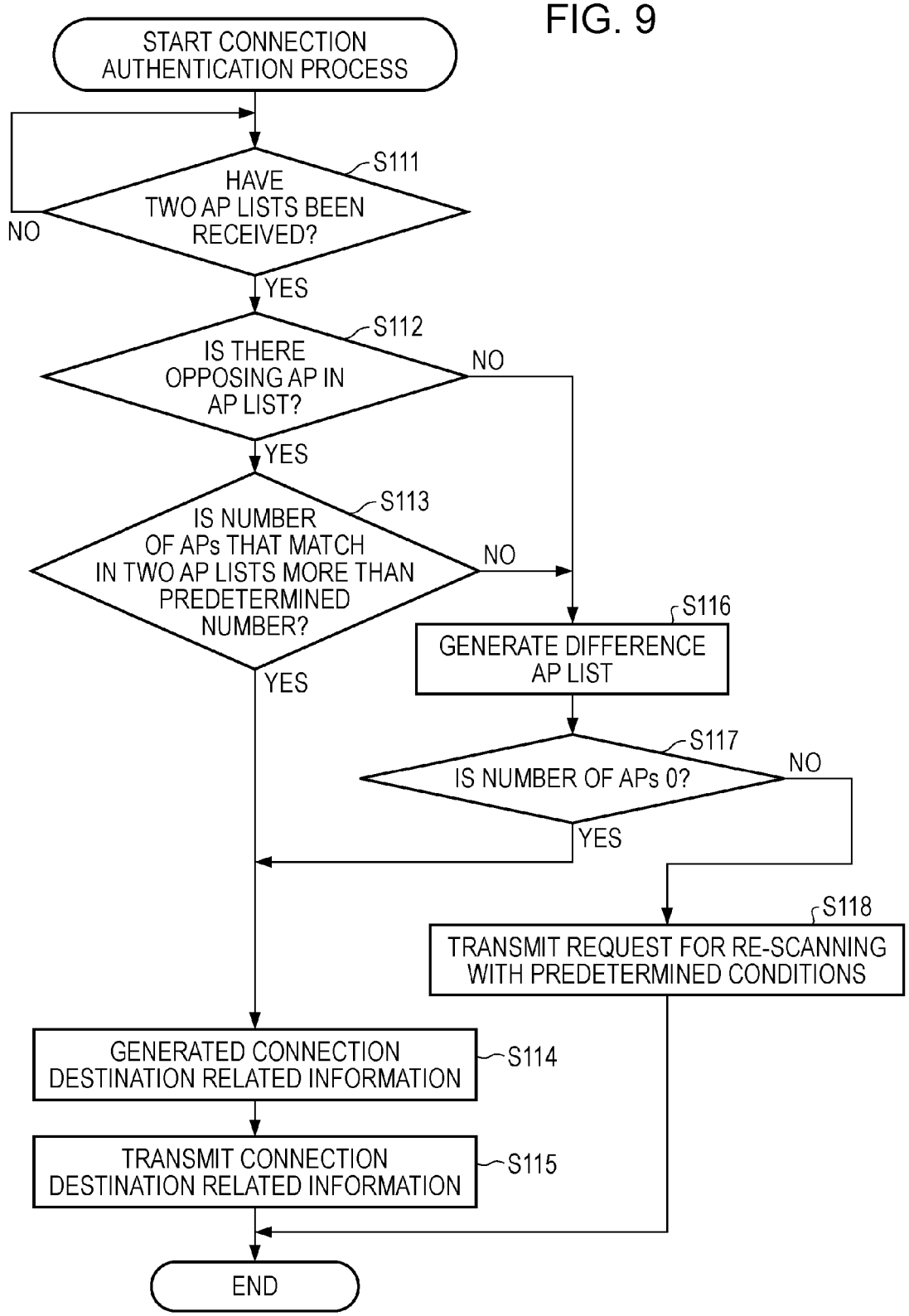
FIG. 9 is a flowchart that describes a connection authentication process.

Returning to the flowchart of FIG. 9, in a case when it is determined in step S113 that the number of APs that match in the two AP lists is greater than the predetermined number, that is, in a case when it is determined that the two mobile terminal apparatuses 11 that are the transmission sources of the two AP lists are present in the vicinity of each other, the process proceeds to step S114.

In step S114, the authentication processing unit 93 authenticates one or both of the two mobile terminal apparatuses 11 that are the transmission sources of the two compared AP lists, and generates connection destination related information that relates to the connection destinations of the authenticated mobile terminal apparatuses 11.

In step S115, the transmission unit 95 transmits the connection destination related information that is generated by the authentication processing unit 93 to the mobile terminal apparatuses 11 that are the transmission sources of the compared AP lists.

On the other hand, in a case when the predetermined number in step S113 is four, for example, since the number of APs that match in the AP lists 101 and 102 is three in the example of FIG. 10, it is determined that the number of APs that match in the two AP lists is not greater than the predetermined number, and the process proceeds to step S116. Further, in a case when it is determined in step S112 that there are no opposing APs present in the AP list, the process also proceeds to step S116.

In step S116, the difference AP list generation unit 94 generates a difference AP list that is a list of the APs that do not match in the two AP lists. In the example of FIG. 10, the difference AP list is configured by the APs (AP information) excluding the APs of a match AP list 103 from the APs of the AP lists 101 and 102. At this time, APs for which the radio signal strength is less than a predetermined standard value (for example, 100) are not included in the difference AP list.

The difference AP list generation unit 94 determines in step S117 whether or not the number of APs in the generated difference AP list is 0.

In a case when it is determined in step S117 that the number of APs in the difference AP list is 0, that is, in a case when there are no opposing APs in the two AP lists but all the APs are matching or in a case when the number of APs that match in the two AP lists is less than the predetermined number but the radio signal strengths of all of the APs that do not match are less than the predetermined standard value, it is determined that the two mobile terminal apparatuses 11 that are the transmission sources of the two AP lists are present in the vicinity of each other, and the process proceeds to step S114. Furthermore, one or both of the two mobile terminal apparatuses 11 are authenticated and the connection destination related information that relates to the connection destinations of the mobile terminal apparatuses 11 is transmitted.

On the hand, in a case when it is determined in step S117 that the number of APs in the difference AP list is not 0, the process proceeds to step S118.

In step S118, the transmission unit 95 transmits a request for a re-scan for the APs by predetermined conditions based on the difference AP list generated by the difference AP list generation unit 94 to the mobile terminal apparatuses 11. Specifically, the transmission unit 95 generates a shortage list that is a list of APs that are not present in the AP lists that are transmitted from the mobile terminal apparatuses 11 but are present in the difference AP list with respect to the two mobile terminal apparatuses 11 that are the transmission sources of the AP lists, that is, APs of which the radio signal strength is equal to or greater than the standard value and that are present only in the AP list of the opposing terminal, and transmits a request for a re-scan for the APs by conditions based on the shortage list to the mobile terminal apparatuses 11. In such a manner, since the likelihood of APs for which the radio signal strength is less than the standard value being detected in the re-scan is low, such APs are not included in the shortage list.

For example, in the example of FIG. 10, for the mobile terminal apparatus 11-1 that has transmitted the AP list 101, a shortage AP list 104 composed of APs with a radio signal strength of equal to or greater than the standard value (100) which are not present in the AP list 101 but are present in the AP list 102, that is, APs that are indicated by the bold broken lines on the AP list 102 in the drawing with the network name "infra_net" is generated. Furthermore, a request for a re-scan for the APs of the shortage list 104 by the channel CH6 is transmitted to the mobile terminal apparatus 11-1.

Further, for the mobile terminal apparatus 11-2 that has transmitted the AP list 102, a shortage AP list 105 composed of APs with a radio signal strength of equal to or greater than the standard value (100) which are not present in the AP list 102 but are present in the AP list 101, that is, APs that are indicated by the bold broken lines on the AP list 101 in the drawing with the network names "intra_net33" and "hotspot2" is generated. Furthermore, a request for a re-scan for the APs of the shortage list 105 by the channels CH1 and CH11 is transmitted to the mobile terminal apparatus 11-2.

Here, without being limited to the communication channels of the APs on the shortage list, the conditions for re-scanning may be the communication mode, the communication method (whether Bluetooth or Wi-Fi), or the like.

According to the above processes, when the AP lists from the two mobile terminal apparatuses 11 are compared and as a result of the comparison, in a case when the number of APs that match in the respective AP lists is large, it is determined that the two mobile terminal apparatuses 11 are present in the vicinity of each other, and the connection destination related information is transmitted. Therefore, since a large-scale system such as GPS is not used, a database in which the APs and the positional information are associated is not constructed, and the positional information of the mobile terminal apparatuses 11 is not directly used, it is possible for services that are limited to positions to be used by users securely and at low cost.

In particular, since a database in which the APs and the positional information are associated is not used, it is possible to cut not only the cost of introducing such a database but also the maintenance cost.

Further, since the number of APs in cities have been increasing in recent years, it is possible to increase the accuracy of the positional limitations of terminals without having to introduce complex mechanisms. Further, since the AP lists that are generated by the mobile terminal apparatuses 11 will also change from time to time along with the increase in the number of APs, it is not easy to use AP lists from the past, and it is possible to perform vicinity determination with high accuracy.

Here, while ideally if two mobile terminal apparatuses 11 are present at approximately the same position, the respective AP lists would match perfectly, in reality, since there are differences in the reception timings of the beacon packets from the APs of the respective mobile terminal apparatuses 11, the reception characteristics of each apparatus, and the like, it is possible to conceive that the respective AP lists do not completely match.

Therefore, since in the processes described above, it is determined in a case when the number of APs that match in the respective AP lists is greater than the predetermined number that the two mobile terminal apparatuses 11 are present in the vicinity of each other, it is possible to relax the match conditions of the AP lists and to be applied to an actual system.

Further, in a case when the number of APs that match in the respective AP lists is less than the predetermined number, since the request for a re-scan for the APs that were not detected by the respective mobile terminal apparatuses 11 are transmitted to the respective mobile terminal apparatuses 11, even in a case when there is a large difference in the reception timings of the beacon packets, the reception characteristics of each apparatus, and the like for whatever reason, it is possible to provide the opportunity for another vicinity determination. Furthermore, here, since the request for a re-scan by conditions according to the APs to be detected is transmitted to the mobile terminal apparatuses 11, the mobile terminal apparatuses 11 are able to perform a re-scan for the APs efficiently.

Here, while AP lists from two mobile terminal apparatuses 11 are compared above, AP lists from three or more mobile terminal apparatuses 11 may be compared.

Here, while the processes of the mobile terminal apparatus 11 and the management server 12 have been described in detail above, the flow of processes of an information processing system that is configured by the mobile terminal apparatus 11 and the management server 12 will be described below.

<8. Flow of Processes According to Information Processing System>

FIG. 11 is an arrow chart that describes the flow of processes according to an information processing system that is configured by the mobile terminal apparatus 11 and the management server 12.

According to the processes of FIG. 11, services that are limited to the positions of the mobile terminal apparatuses 11-1 and 11-2 become usable by vicinity determination being performed for the mobile terminal apparatuses 11-1 and 11-2 and connections to the respective connection destinations being permitted.

First, the mobile terminal apparatus 11-1 scans for the APs in step S211 and generates an AP list of the APs detected by the scan in step S212. Furthermore, the mobile terminal apparatus 11-1 transmits the generated AP list to the management server 12 in step S213.

Similarly, the mobile terminal apparatus 11-2 scans for the APs in step S221 and generates an AP list of the APs detected by the scan in step S222. Furthermore, the mobile terminal apparatus 11-2 transmits the generated AP list to the management server 12 in step S223.

The management server 12 receives the AP list from the mobile terminal apparatus 11-1 in step S231 and receives the AP list from the mobile terminal apparatus 11-2 in step S232. Furthermore, the management server 12 compares to two received AP lists in step S233.

Here, as a result of the comparison of the two AP lists, if the number of APs that match in the respective AP lists is greater than a predetermined number, the management server 12 respectively authenticates the mobile terminal apparatuses 11-1 and 11-2 in step S234 and generates connection destination related information for each. Furthermore, the management server 12 transmits the generated connection destination related information to the mobile terminal apparatus 11-2 in step S235 and transmits the generated connection destination related information to the mobile terminal apparatus 11-1 in step S236.

The mobile terminal apparatus 11-1 receives the connection destination related information from the management server 12 in step S214 and the mobile terminal apparatus 11-2 receives the connection destination related information from the management server 12 in step S224.

According to the above processes, since vicinity determination is performed for the mobile terminal apparatuses 11-1 and 11-2 and the connections to the respective connection destinations are permitted according to the determination results thereof, the respective users of the mobile terminal apparatuses 11-1 and 11-2 become able to user services that are limited to positions.

While above, connections to the respective connection destinations have been permitted as a result of the vicinity determination of the mobile terminal apparatuses 11-1 and 11-2, next, the flow of processes in a case when connections to the respective connection destinations are not permitted will be described with reference to the arrow chart of FIG. 12.

Here, since the processes of steps S311 to S313, S321 to S323, and S331 to S333 of the arrow chart of FIG. 12 are the same as the processes of steps S211 to S213, S221 to S223, and S231 to S233 of the arrow chart of FIG. 11, description thereof will be omitted.

That is, here, as a result of a comparison of two AP lists in step S333, the number of APs that match in the respective AP lists is less than the predetermined number, the management server 12 generates a difference AP list in step S334. Furthermore, in step S335, the management server 12 transmits a re-scan request for the APs by predetermined conditions based on the difference AP list (shortage list) to the mobile terminal apparatus 11-2. Further, in step S336, the management server 12 transmits a re-scan request for the APs by predetermined conditions based on the difference AP list (shortage list) to the mobile terminal apparatus 11-2.

Once the mobile terminal apparatus 11-1 receives the re-scan request from the management server 12 in step S314, the mobile terminal apparatus 11-1 scans for the APs in step S315. At this time, the mobile terminal apparatus 11-1 scans for the APs by predetermined conditions (communication channel, communication mode, and the like) that are included in the re-scan request. In step S316, the mobile terminal apparatus 11-1 generates an AP list of the APs that were detected by the scan. Here, the AP list generated here has AP information added and updated on the AP list generated in step S312. Furthermore, the mobile terminal apparatus 11-1 transmits the generated AP list to the management server 12 in step S317.

On the other hand, when the mobile terminal apparatus 11-2 receives the re-scan request from the management server 12 in step S324, the mobile terminal apparatus 11-2 scans for the APs in step S325. At this time, the mobile terminal apparatus 11-2 scans for the APs by predetermined conditions (communication channel, communication mode, and the like) that are included in the re-scan request. In step S326, the mobile terminal apparatus 11-2 generates an AP list of the APs that were detected by the scan. Here, the AP list generated here has AP information added and updated on the AP list generated in step S322. Furthermore, the mobile terminal apparatus 11-2 transmits the generated AP list to the management server 12 in step S327.

The management server 12 receives the AP list from the mobile terminal apparatus 11-1 in step S337 and receives the AP list from the mobile terminal apparatus 11-2 in step S338. The management server 12 then compares the two received AP lists and thereafter, processes according to the comparison result are executed.

According to the processes described above, even in a case when vicinity determination is performed for the mobile terminal apparatuses 11-1 and 11-2 and connections to the respective connections are not permitted due to a large difference being causes in the reception timings of the beacon packets, the reception characteristics of each apparatus, and the like for whatever reason, since opportunities for vicinity determination are provided again, the processes are able to be applied to an actual system. Further, since re-scan requests by predetermined conditions are transmitted to the mobile terminal apparatuses 11-1 and 11-2, the mobile terminal apparatuses 11-1 and 11-2 are able to perform re-scans for the APs efficiently.

Here, in a case when authentication is not made after vicinity determination of the mobile terminal apparatuses 11-1 and 11-2 are performed by the management server 12 a predetermined number of times, for example, three times or the like, it may be determined that the mobile terminal apparatuses 11-1 and 11-2 are not present in the vicinity of one another, and the process may be ended.

<9. Applications of Present Disclosure>

Here, applications in which the embodiments of the present disclosure are applied to actual systems will be described.

[Application to Website Provision System]

FIG. 13 is a diagram that illustrates a configuration example of a website provision system to which the embodiments of the present disclosure are applied.

A terminal 111 that includes an NFC function in the website provision system of FIG. 13 obtains, for example, by performing NFC communication with a poster 112 that includes an IC tag in a movie theater, the URL of a website that only users in the movie theater are able to access.

An AP 113 is installed in the movie theater similarly to the poster 112, for example, and is connected to the poster 112. The AP 113 functions as one of the mobile terminal apparatuses 11 described above, generates an AP list by scanning for the APs, and transmits the AP list to a web server 115 via the Internet.

On the other hand, the terminal 111 also functions as one of the mobile terminal apparatuses 11 described above, generates an AP list by scanning for the APs, and transmits the AP list to the web server 115 via a wireless relay station 114 that performs 3 G communication.

The web server 115 functions as the management server 12 described above, compares the AP lists from the terminal 111 and the AP 113, issues a session ID as connection destination related information based on the comparison result, and transmits the session ID to the terminal 111. The session ID is a key that is only valid once, the argument for which is set when performing HTTP (HyperText Transfer Protocol) connection, and is used for the authenticating the user. That is, the user of the terminal 111 is able to login to the desired website by accessing the URL from the poster 112 with a valid session ID. The authentication information and the like of the user, for example, are stored in a registered AP database 115a.

[Flow of Processes According to Website Provision System]

Next, the flow of processes in the website provision system of FIG. 13 will be described with reference to the arrow chart of FIG. 14.

The processes of FIG. 14 are started when the terminal 111 is held over the IC tag of the poster 112, for example.

By reading the IC tag in step S411, the terminal 111 obtains the URL along with an AP authentication flag that indicates that the terminal 111 has been authenticated by the AP 113 that is connected to the poster 112. On the other hand, when the poster 112 detects that the IC tag has been read by the terminal 111, the poster 112 transmits an AP list creation request to the AP 113 in step S421.

When the AP 113 receives the AP list creation request from the poster 112, the AP 113 creates (generates) an AP list composed of the AP information of an AP 4 and an AP 5 in step S431, and transmits the AP list to the website server 115 in step S432. At this time, while the AP information of the AP 113 itself is included in the AP list that is created by the AP 113, such information may be not included.

On the other hand, the terminal 111 creates (generates) an AP list composed of the AP information of the AP 4 and the AP 5 in step S412 and transmits the AP list to the wireless relay station 114 in step S413. When the wireless relay station 114 receives the AP list from the terminal 111, the wireless relay station 114 transmits the AP list to the web server 115 in step S441.

The web server 115 compares the AP lists from the terminal 111 and the AP 113 in step S451 and transmits a session ID based on the comparison result to the terminal 111 in step S452. Specifically, the web server 115 transmits the session ID to the wireless relay station 114 in step S452, and the wireless relay station 114 transmits the session ID from the web server 115 to the terminal 111 in step S442. Here, while AP lists are transmitted to the server 115 from a plurality of terminals and APs, the web server 115 compares the AP lists that are close in terms of time.

When the terminal 111 receives a session ID from the web server 115, in step S414, the argument of the session ID is set to the URL that is obtained from the poster 112, the terminal 111 transmits an HTTP command (GET) such as, for example, "http://www.abc.com/index.html?session= 1232456" to the web server 115. Specifically, the terminal 111 transmits the HTTP command to the wireless relay station 114 in step S414 and the wireless relay station 114 transmits the HTTP command from the terminal 111 to the web server 115 in step S443.

Once the web server 115 receives the HTTP command from the terminal, the web server 115 checks the validity of the session ID in step S453, and if the session ID is valid, performs a login (redirect) process to a specified website. Here, in a case when the session ID is not valid or in a case when there is no session ID, the web server 115 does not perform a login process and transmits the html file of another URL to the terminal 111.

As described, above, the embodiments of the present disclosure are able to be applied to a website provision system of providing a website that is limited to the position of a terminal.

[Application to SNS System]

FIG. 15 is a diagram that illustrates a configuration example of an SNS (Social Network Service) system to which the embodiments of the present disclosure are applied.

In the SNS system of FIG. 15, devices 211 and 212 include an NFC function, and the devices perform NFC communication with each other when the respective users thereof perform friend registration on the SNS. The users of the devices 211 and 212 are both registered on the SNS that is provided by the SNS system.

The devices 211 and 212 respectively function as one of the mobile terminal apparatuses 11 described above, generate AP lists by scanning for the APs, and transmit the AP lists to an SNS server 215 via a wireless relay station 213 that performs 3 G communication.

An AP 214 also functions as one of the mobile terminal apparatuses 11 described above, generates an AP lists by scanning for the APs, and transmits the AP list to the SNS server 215. The AP 214 is registered as a special AP in order to perform vicinity determination of the devices in the SNS server 215, that is, comparison of the AP lists more strictly, and for example, generates an AP list according to an instruction from the SNS server 215 and transmits the AP list to the SNS server 215.

The SNS server 215 functions as the management server 12 described above, compares the AP lists from the devices 211 and 212, registers the devices 211 and 212 as friends based on the comparison result, and updates a user DB 216. Various pieces of information on the users that are registered on the SNS are stored in the user DB 216. Further, the SNS server 215 compares the AP lists from the devices 211 and 212 with the AP list from the AP 214 as necessary, and performs vicinity determination of the devices 211 and 212.

[Flow of Processes According to SNS System]

Next, the flow of processes according to the SNS system of FIG. 15 will be described with reference to the arrow chart of FIG. 16.

The processes of FIG. 16 are started, for example, when the device 211 and the device 212 are brought near each other in a state in which the two users are both logged in to the SNS.

The device 211 performs NFC communication in step S511 and transmits an AP authentication flag that indicates that the other party has been authenticated to the device 212 along with its own email address. On the other hand, the device 212 performs NFC communication in S521 and transmits an AP authentication flag that indicates that the other party has been authenticated to the device 211 along with its own email address.

Once the device 211 ends the NFC communication with the device 212, the device 211 creates (generates) an AP list composed of the AP information of an AP 4, an AP 5, an AP 214 in step S512 and transmits the AP list to the wireless relay station 213 along with a user ID that specifies the user that is registered on the SNS in step S513. Once the wireless relay station 213 receives the AP list and the user ID from the device 211, the wireless relay station 213 transmits the AP list and the user ID to the SNS server 215 in step S531.

Once the device 212 ends the NFC communication with the device 211, the device 212 creates (generates) an AP list composed of the AP information of the AP 4, the AP 5, the AP 214 in step S522 and transmits the AP list to the wireless relay station 213 along with a user ID that specifies the user that is registered on the SNS in step S523. Once the wireless relay station 213 receives the AP list and the user ID from the device 212, the wireless relay station 213 transmits the AP list and the user ID to the SNS server 215 in step S532.

Once the SNS server 215 receives the AP list and the user ID from the devices 211 and 212, the SNS server 215 determines whether or not the AP 214 is present in the respective AP lists, and in a case when the AP 214 is present, instructs creation of an AP list to the AP 214. Here, since the AP 214 is presents in the AP lists from the devices 211 and 212, the AP 214 creates an AP list composed of the AP information of the AP 4 and the AP 5 in step S541 and transmits the AP list to the SNS server 215 in step S542.

Once the SNS server 215 receives the AP list from the AP 214, the SNS server 215 compares each of the AP lists from the devices 211 and 212 and the AP list from the AP 214 in step S551, and if the number of APs that match in the respective AP lists is greater than a predetermined number, permits friend registration of the users of the devices 211 and 212 in step S552. At this time, the SNS server 215 updates the user DB 216 so that the user IDs of the users of the devices 211 and 212 are added to a friends list on a community website in which both users participate. Further, at this time, the SNS server 215 may respectively transmit a URL for accessing the community website in which both users participate as connection destination related information to the devices 211 and 212.

As described above, the embodiments of the present disclosure are able to be applied to an SNS system that provides communication that is limited to the positions of the devices.

In particular, above, since in the vicinity determination of the devices 211 and 212, in addition to the comparison of the AP lists of the devices 211 and 212, a comparison with the AP list of the AP 214 is performed, the AP 214 acts as a third party that guarantees the legitimacy of the positions of the devices 211 and 212, suppressing the risk of misrepresentation (user identity fraud) of the AP lists of the respective users of the devices 211 and 212. By introducing the SNS system described above at an elementary school, for example, and establishing the AP 214 within the school grounds, it is possible to provide a school-specific SNS system in which the students are able to register friends only within the school.

Here, while the processes of FIG. 16 are started when the devices 211 and 212 are brought near each other, the processes of FIG. 16 may be started when predetermined buttons are respectively pressed on the devices 211 and 212.

[Application to Content Provision System]

FIG. 17 is a diagram that illustrates a configuration example of a content provision system to which the embodiments of the present disclosure are applied.

According to the content provision system of FIG. 17, a terminal 311 that includes a wireless LAN communication function functions as one of the mobile terminal apparatuses 11 described above. Once an instruction to perform wireless LAN connection at a hotspot in a shop, for example, is instructed by an operation by the user, the terminal 311 generates an AP list by scanning for the APs and transmits the AP list to a RADIUS server 313 via a relay station 312 that performs 3 G communication.

The Radius (Remote Authentication Dial In User Service) server 313 determines whether or not management target APs that are management by a registered AP database 313a are present in the AP list from the terminal 311, and in a case when management target APs are present, transmits a command for an AP list request to the management target APs. The RADIUS server 313 is able to provide predetermined content via the management target APs.

Further, the RADIUS server 13 functions as the management server 12 described above, and when an AP list is transmitted from management target APs, the RADIUS server 313 compares the AP lists from the terminal 311 and the management target APs and transmits the address of the management target APs as connection destination related information based on the comparison result and a temporary key for the terminal 311 to perform wireless LAN connection to the terminal 311.

As well as being one of the management target APs that are management by the RADIUS server 313, an AP 314 functions as one of the mobile terminal apparatuses 11 described above, generates an AP list by scanning for the APs according to the command for an AP list request from the RADIUS server 313, and transmits the AP list to the RADIUS server 313.

[Flow of Processes According to Content Provision System]

Next, the flow of processes according to the content provision system of FIG. 17 will be described with reference to the arrow chart of FIG. 18.

The processes of FIG. 18 are started, for example, when an instruction to perform wireless LAN connection to the AP 314 is given to the terminal 311 by an operation of the user in a hotspot of a shop in order to access content such as music and copyrighted materials that are limited to the shop or an area.

The terminal 311 creates (generates) an AP list composed of the AP information of an AP 4, an AP 5, and an AP 314 in step S611, and transmits the AP list to the relay station 312 in step S612. When the relay station 312 receives the AP list from the terminal 311, the relay station 312 transmits the AP list to the RADIUS server 313 in step S621.

Once the RADIUS server 313 receives the AP list from the terminal 311, in step S631, the RADIUS server 313 searches for the AP 314 that is the connection destination AP of the wireless LAN connection and that is the management target AP in the AP list from the terminal 311.

Here, since the APs that are present on the AP list from the terminal 311 are the AP 4, the AP 5, and the AP 314, the RADIUS server 313 transmits a command for an AP list request to the AP 314 that is the management target AP in step S632.

Once the AP 314 receives the command from the RADIUS server 313, the RADIUS server 313 creates (generates) an AP list composed of the AP information of the AP 4 and the AP 5 in step S641 and transmits the AP list to the RADIUS server 313 in step S642.

Once the RADIUS server 313 receives the AP list from the AP 314, the RADIUS server 313 compares the AP lists from the terminal 311 and the AP 314 in step S633, and in step S634, transmits the address of the AP 314 and a temporary key for the terminal 311 to perform wireless LAN connection to the terminal 311 based on the comparison result. Specifically, the RADIUS server 313 transmits the address of the AP 314 and the temporary key to the relay station 312 in step S634, and the relay station 312 transmits the address of the AP 314 and the temporary key from the RADIUS server 313 to the terminal 311 in step S622.

Once the terminal 311 receives the address of the AP 314 and the temporary key from the RADIUS server 313, the terminal 311 connects to the AP 314 by wireless LAN (Wi-Fi connection) using the address of the AP 314 and the temporary key in step S613. Once connected to the terminal 311, the AP 314 request an authentication process of the terminal 311 to the RADIUS server 313 in step S643. Furthermore, once the authentication process of the terminal 311 is performed by the RADIUS server 313, the terminal 311 becomes able to access content that is limited to a shop or an area via the AP 314 that is performing wireless LAN connection.

As described above, the embodiment of the present disclosure are able to be applied to a content provision system that provides content that is limited to the position of the terminal.

In a case when the series of processes described above are to be executed by software, a program that configures the software is installed from a network such as the Internet or a recording medium such as a removable medium.

Here, the series of processes described in the specification include not only processes that are performed in time series along the order described, but also processes that are not necessarily executed in time series but in parallel or individually.

Further, the embodiments of the present disclosure are not limited to those described above, and various modifications are possible without departing from the gist of the present disclosure.

Furthermore, the embodiments of the present disclosure may adopt the following configurations.

(1) A terminal apparatus including:
a scan processing unit that scans for wireless communication apparatuses that are present in a range within which wireless communication is possible;
a list generation unit that generates a list of the wireless communication apparatuses that are detected by the scan by the scan processing unit;
a transmission unit that transmits the list that is generated by the list generation unit to an information processing apparatus; and
a reception unit that receives connection destination related information that relates to a connection destination, which is transmitted from the information processing apparatus based on a comparison result of the list and the list from another terminal apparatus.

(2) The terminal apparatus according to (1),
wherein the reception unit receives a request for a scan for the wireless communication apparatuses with predetermined conditions, which is transmitted from the information processing apparatus, and
the scan processing unit scans for the wireless communication apparatuses by the predetermined conditions based on the request that is received by the reception unit.

(3) The terminal apparatus according to (2),
wherein the reception unit receives a request for a scan for the wireless communication apparatuses at a predetermined communication channel, which is transmitted from the information processing apparatus, and
the scan processing unit scans for the wireless communication apparatuses at the predetermined communication channel based on the request that is received by the reception unit.

(4) The terminal apparatus according to (2),
wherein the reception unit receives a request for a scan for the wireless communication apparatuses in a predetermined communication mode which is transmitted from the information processing apparatus, and
the scan processing unit scans for the wireless communication apparatuses in the predetermined communication mode based on the request that is received by the reception unit.

(5) A communication method including:
scanning for wireless communication apparatuses that are present in a range within which wireless communication is possible;
generating a list of the wireless communication apparatuses that are detected by the scanning;
transmitting the list that is generated by the list generating process to an information processing apparatus; and
receiving connection destination related information that relates to a connection destination, which is transmitted from the information processing apparatus based on a comparison result of the list with the list from another terminal apparatus.

(6) A non-transitory storing medium storing a program that causes a computer to execute:
scanning for wireless communication apparatuses that are present in a range within which wireless communication is possible;
generating a list of the wireless communication apparatuses that are detected by the scanning;
transmitting the list that is generated by the list generating process to an information processing apparatus; and
receiving connection destination related information that relates to a connection destination, which is transmitted from the information processing apparatus based on a comparison result of the list with the list from another terminal apparatus.

(7) An information processing apparatus including:
a reception unit that receives lists of wireless communication apparatuses that are detected by a scan for the wireless communication apparatuses that are present in a range within which wireless communication is possible, which are respectively transmitted from two or more terminal apparatuses that perform wireless communication with the wireless communication apparatuses;
a list comparison unit that compares the lists from the two or more terminal apparatuses which are received by the reception unit;
a connection destination related information generation unit that generates connection destination related information that relates to connection destinations of the terminal apparatuses based on a comparison result of the list comparison unit; and
a transmission unit that transmits the connection destination related information that is generated by the connection destination information generation unit to the terminal apparatuses.

(8) The information processing apparatus according to (7),
wherein the list comparison unit compares the number of wireless communication apparatuses that respectively match the lists from the two or more terminal apparatuses, and
the connection destination related information generation unit generates the connection destination related information in a case when the number of wireless communication apparatuses that respectively match the lists is greater than a predetermined number.

(9) The information processing apparatus according to (8),
wherein the transmission unit transmits a request for a scan for the wireless communication apparatuses by predetermined conditions to the terminal apparatus in a case when the number of wireless communication apparatuses that respectively match the lists is less than the predetermined number.

(10) The information processing apparatus according to (9),
wherein the transmission unit transmits a request for a scan at a communication channel of wireless communication with a higher radio field strength than a predetermined value to the terminal apparatus in wireless communication between the wireless communication apparatus and the terminal apparatus that do not match in a case when the number of wireless communication apparatuses that respectively match the lists is less than the predetermined number.

(11) The information processing apparatus according to (9), wherein the transmission unit transmits a request for a scan in a communication mode of wireless communication with a higher radio field strength than a predetermined value to the terminal apparatus in wireless communication between the wireless communication apparatus and the terminal apparatus that do not match in a case when the number of wireless communication apparatuses that respectively match the lists is less than the predetermined number.

(12) The information processing apparatus according to any one of (7) to (11), wherein the connection destination related information generation unit performs authentication of the terminal apparatus based on a comparison result of the list comparison unit and generates the connection destination related information.

(13) An information processing method including:

receiving lists of wireless communication apparatuses that are detected by a scan for the wireless communication apparatuses that are present in a range within which wireless communication is possible, which are respectively transmitted from two or more terminal apparatuses that perform wireless communication with the wireless communication apparatuses;

comparing the lists from the two or more terminal apparatuses which are received by the receiving process;

generating connection destination related information that relates to connection destinations of the terminal apparatuses based on a comparison result by the comparing of the lists; and transmitting the connection destination related information that is generated by the process of generating the connection destination related information to the terminal apparatuses.

(14) A non-transitory storing medium storing a program that causes a computer to execute:

receiving lists of wireless communication apparatuses that are detected by a scan for the wireless communication apparatuses that are present in a range within which wireless communication is possible, which are respectively transmitted from two or more terminal apparatuses that perform wireless communication with the wireless communication apparatuses;

comparing the lists from the two or more terminal apparatuses which are received by the receiving process;

generating connection destination related information that relates to connection destinations of the terminal apparatuses based on a comparison result by the comparing of the lists; and transmitting the connection destination related information that is generated by the process of generating the connection destination related information to the terminal apparatuses.

(15) An information processing system including:

two or more terminal apparatuses that perform wireless communication with wireless communication apparatuses; and an information processing apparatus that performs communication with the terminal apparatuses, wherein the terminal apparatuses include a scan processing unit that scans for the wireless communication apparatuses that are present in a range within which wireless communication is possible, a list generation unit that generates a list of the wireless communication apparatuses that are detected by a scan by the scan processing unit, a transmission unit that transmits the list that is generated by the list generation unit to an information processing apparatus, and a reception unit that receives connection destination related information that relates to a connection destination, which is transmitted from the information processing apparatus based on a comparison result between the list and the list from another terminal apparatus, wherein the information processing apparatus includes a reception unit that receives lists of wireless communication apparatuses that are detected by a scan for the wireless communication apparatuses that are present in a range within which wireless communication is possible, which are respectively transmitted from two or more terminal apparatuses that perform wireless communication with the wireless communication apparatuses, a list comparison unit that compares the lists from the two or more terminal apparatuses which are received by the reception unit, a connection destination related information generation unit that generates connection destination related information that relates to connection destinations of the terminal apparatuses based on a comparison result of the list comparison unit, and a transmission unit that transmits the connection destination related information that is generated by the connection destination related information generation unit to the terminal apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A terminal apparatus comprising:
   a scan processing unit that scans for wireless communication apparatuses that are present in a range within which wireless communication is possible;
   a list generation unit that generates a list of the wireless communication apparatuses that are detected based on the scan by the scan processing unit;
   a transmission unit that transmits the generated list to an information processing apparatus; and
   a reception unit that receives connection destination related information that relates to a connection destination, which is transmitted from the information processing apparatus based on a comparison between the transmitted list and a list from another terminal apparatus,
   wherein the reception unit receives a request to scan for the wireless communication apparatuses with predetermined conditions, the request being transmitted from the information processing apparatus, and the scan processing unit scans for the wireless communication apparatuses using the predetermined conditions based on the received request.

2. The terminal apparatus according to claim 1, wherein the reception unit receives a request for a scan for the wireless communication apparatuses at a predetermined communication channel, which is transmitted from the information processing apparatus, and the scan processing unit scans for the wireless communication apparatuses at the predetermined communication channel based on the request that is received by the reception unit.

3. The terminal apparatus according to claim 1, wherein the reception unit receives a request for a scan for the wireless communication apparatuses in a predetermined communication mode which is transmitted from the information processing apparatus, and the scan processing unit scans for the wireless communication apparatuses in the predetermined communication mode based on the request that is received by the reception unit.

4. A communication method comprising:
- scanning for wireless communication apparatuses that are present in a range within which wireless communication is possible;
- generating a list of the wireless communication apparatuses that are detected based on the scanning;
- transmitting the generated list to an information processing apparatus; and
- receiving connection destination related information that relates to a connection destination, which is transmitted from the information processing apparatus based on a comparison between the transmitted list and a list from another terminal apparatus,
- wherein a request is received to scan for the wireless communication apparatuses with predetermined conditions which is transmitted from the information processing apparatus, and the wireless communication apparatuses are scanned using the predetermined conditions based on the received request.

5. A non-transitory computer-readable storage medium having stored thereon, a computer program having at least one code section, the at least one code section being executable by one or more processors for causing to cause a computer to perform steps comprising:
- scanning for wireless communication apparatuses that are present in a range within which wireless communication is possible;
- generating a list of the wireless communication apparatuses that are detected based on the scanning;
- transmitting the generated list to an information processing apparatus; and
- receiving connection destination related information that relates to a connection destination, which is transmitted from the information processing apparatus based on a comparison between the transmitted list and a list from another terminal apparatus, wherein a request is received to scan for the wireless communication apparatuses with predetermined conditions, which is transmitted from the information processing apparatus, and the wireless communication apparatuses are scanned using the predetermined conditions based on the received request.

6. An information processing apparatus comprising:
- a reception unit that receives lists of wireless communication apparatuses that are detected based on a scan for the wireless communication apparatuses that are present in a range within which wireless communication is possible, wherein the lists are respectively transmitted from two or more terminal apparatuses that perform wireless communication with the wireless communication apparatuses;
- a list comparison unit that compares the lists from the two or more terminal apparatuses which are received by the reception unit;
- a connection destination related information generation unit that generates connection destination related information that relates to connection destinations of the terminal apparatuses based on the comparison of the lists by the comparison unit; and
- a transmission unit that transmits the connection destination related information that is generated by the connection destination information generation unit to the terminal apparatuses,
- wherein the list comparison unit compares a number of wireless communication apparatuses that respectively match the lists from the two or more terminal apparatuses, and the connection destination related information generation unit generates the connection destination related information when the number of wireless communication apparatuses that respectively match the lists is greater than a predetermined number.

7. The information processing apparatus according to claim 6, wherein the transmission unit transmits a request for a scan for the wireless communication apparatuses by predetermined conditions to the terminal apparatuses in a case when the number of wireless communication apparatuses that respectively match the lists is less than the predetermined number.

8. The information processing apparatus according to claim 7, wherein the transmission unit transmits a request for a scan at a communication channel of wireless communication with a higher radio field strength than a predetermined value to the terminal apparatuses when the number of wireless communication apparatuses that respectively match the lists is less than the predetermined number.

9. The information processing apparatus according to claim 7, wherein the transmission unit transmits a request for a scan in a communication mode of wireless communication with a higher radio field strength than a predetermined value to the terminal apparatuses when the number of wireless communication apparatuses that respectively match the lists is less than the predetermined number.

10. The information processing apparatus according to claim 6, wherein the connection destination related information generation unit performs authentication of the terminal apparatuses based on the comparison of the lists and generates the connection destination related information.

11. An information processing method comprising:
- receiving lists of wireless communication apparatuses that are detected based on a scan for the wireless communication apparatuses that are present in a range within which wireless communication is possible, wherein the lists are respectively transmitted from two or more terminal apparatuses that perform wireless communication with the wireless communication apparatuses;
- comparing the lists from the two or more terminal apparatuses;
- generating connection destination related information that relates to connection destinations of the terminal apparatuses based on the comparison of the lists; and
- transmitting the generated connection destination related information to the terminal apparatuses,
- wherein a number of wireless communication apparatuses that respectively match the lists from the two or more terminal apparatuses are compared, and the connection destination related information is generated when the number of wireless communication apparatuses that respectively match the lists is greater than a predetermined number.

12. A non-transitory recording medium storing a program that causes a computer to execute:
- receiving lists of wireless communication apparatuses that are detected based on a scan for the wireless communication apparatuses that are present in a range within which wireless communication is possible, wherein the lists are respectively transmitted from two or more terminal apparatuses that perform wireless communication with the wireless communication apparatuses;
- comparing the lists from the two or more terminal apparatuses;
- generating connection destination related information that relates to connection destinations of the terminal apparatuses based on the comparison of the lists; and transmitting the generated connection destination related information to the terminal apparatuses, wherein a number of wireless communication apparatuses that respectively match the lists from the two or more terminal apparatuses are compared, and the connection destination related information is generated when the number of wireless communication apparatuses that respectively match the lists is greater than a predetermined number.

13. An information processing system comprising:

two or more terminal apparatuses that perform wireless communication with wireless communication apparatuses; and an information processing apparatus that performs communication with the terminal apparatuses, wherein the terminal apparatuses each comprise:
- a scan processing unit that scans for the wireless communication apparatuses that are present in a range within which wireless communication is possible,
- a list generation unit that generates a list of the wireless communication apparatuses that are detected by a scan by the scan processing unit, a transmission unit that transmits the list that is generated by the list generation unit to an information processing apparatus, and
- a reception unit that receives connection destination related information that relates to a connection destination, which is transmitted from the information processing apparatus based on a comparison result between the list and the list from another terminal apparatus, wherein the information processing apparatus comprises:
- a reception unit that receives lists of wireless communication apparatuses that are detected by a scan for the wireless communication apparatuses that are present in a range within which wireless communication is possible, which are respectively transmitted from two or more terminal apparatuses that perform wireless communication with the wireless communication apparatuses,
- a list comparison unit that compares the lists from the two or more terminal apparatuses which are received by the reception unit,
- a connection destination related information generation unit that generates connection destination related information that relates to connection destinations of the terminal apparatuses based on a comparison result of the list comparison unit, and
- a transmission unit that transmits the connection destination related information that is generated by the connection destination related information generation unit to the terminal apparatuses.

* * * * *